(12) United States Patent
Liu et al.

(10) Patent No.: US 12,069,645 B2
(45) Date of Patent: Aug. 20, 2024

(54) WIRELESS COMMUNICATION METHOD AND APPARATUS AND COMMUNICATION DEVICE

(71) Applicant: HUAWEI TECHNOLOGIES CO., LTD., Guangdong (CN)

(72) Inventors: Xianda Liu, Beijing (CN); Kunpeng Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 366 days.

(21) Appl. No.: 17/672,383

(22) Filed: Feb. 15, 2022

(65) Prior Publication Data
US 2022/0174698 A1    Jun. 2, 2022

Related U.S. Application Data

(63) Continuation of application No. PCT/CN2020/109049, filed on Aug. 14, 2020.

(30) Foreign Application Priority Data

Aug. 15, 2019 (CN) .......................... 201910755366.2

(51) Int. Cl.
*H04W 72/1263* (2023.01)
*H04L 1/08* (2006.01)
(Continued)

(52) U.S. Cl.
CPC ........... *H04W 72/1263* (2013.01); *H04L 1/08* (2013.01); *H04L 5/0051* (2013.01); *H04W 72/0446* (2013.01)

(58) Field of Classification Search
CPC ......... H04W 72/1263; H04W 72/0446; H04L 1/08; H04L 5/0051; H04L 5/0044; H04L 5/0091
See application file for complete search history.

(56) References Cited

U.S. PATENT DOCUMENTS

| | | | |
|---|---|---|---|
| 2016/0234857 A1* | 8/2016 | Chen | ..................... H04L 5/0044 |
| 2019/0149365 A1 | 5/2019 | Chatterjee et al. | |
| 2019/0222274 A1 | 7/2019 | Dou et al. | |

FOREIGN PATENT DOCUMENTS

| | | |
|---|---|---|
| CN | 107342852 A | 11/2017 |
| CN | 108123778 A | 6/2018 |

(Continued)

OTHER PUBLICATIONS

Huawei, HiSilicon, "Summary of evaluation results for reliability robustness based multi-TRP transmission," 3GPP TSG RAN WG1 meeting #96bis, R1-1905806, Xi'an, China, Apr. 8-12, 2019, 35 pages.

(Continued)

*Primary Examiner* — Chae S Lee
(74) *Attorney, Agent, or Firm* — Fish & Richardson P.C.

(57) ABSTRACT

This disclosure provides example wireless communication methods and communication apparatuses. One example method includes that a network device sends indication information of m first symbol groups used for repeated transmission of a first transport block (TB) to a terminal. The terminal and the network device determine, according to a same rule, a quasi co-location (QCL) assumption corresponding to each of second symbol groups actually used when the first TB is sent or received.

17 Claims, 10 Drawing Sheets

(51) Int. Cl.
*H04L 5/00* (2006.01)
*H04W 72/0446* (2023.01)

(56) References Cited

FOREIGN PATENT DOCUMENTS

| CN | 109150473 A | 1/2019 |
|---|---|---|
| CN | 109802818 A | 5/2019 |
| CN | 110035527 A | 7/2019 |
| WO | 2018127181 A1 | 7/2018 |

OTHER PUBLICATIONS

Nokia, "[96b-NR-09] Email discussion summary on cross-carrier scheduling with different numerologies," 3GPP TSG RAN WG1 Meeting #97, R1-1907065, Reno, NV, USA, May 13-17, 2019, 21 pages.

PCT International Search Report and Written Opinion issued in International Application No. PCT/CN2020/109049 on Nov. 17, 2020, 15 pages (with English translation).

Extended European Search Report issued in European Application No. 20852135.1 on Sep. 9, 2022, 8 pages.

NTT Docomo, Inc., "Enhancements on Multi-TRP/Panel Transmission," 3GPP TSG RAN WG1 #96bis, R1-1904966, Xi'an, China, Apr. 8-12, 2019, 29 pages.

NTT Docomo, Inc., "Enhancements for URLLC Pusch," 3GPP TSG RAN WG1 Meeting #95, R1-1813326, Spokane, USA, Nov. 12-16, 2018, 6 pages.

3GPP TS 38.331 V0.4.0, "3rd Generation Partnership Project Technical Specification Group Radio Access Network NR Radio Resource Control (RRC) Protocol specification(Release 15)," Dec. 2017, 187 pages.

Office Action in Chinese Appln. No. 201910755366.2, dated Mar. 11, 2023, 7 pages.

* cited by examiner

Example a

Example b

WIRELESS COMMUNICATION METHOD AND APPARATUS AND COMMUNICATION DEVICE

CROSS-REFERENCE TO RELATED APPLICATIONS

This application is a continuation of International Application No. PCT/CN2020/109049, filed on Aug. 14, 2020, which claims priority to Chinese Patent Application No. 201910755366.2, filed on Aug. 15, 2019. The disclosures of the aforementioned applications are hereby incorporated by reference in their entireties.

TECHNICAL FIELD

Embodiments of this application relate to the communication field, and more specifically, to a wireless communication method and apparatus, and a communication device.

BACKGROUND

Currently, a repeated transmission technology is known. To improve transmission reliability, a network device schedules a plurality of resources (for example, a plurality of symbol groups) for a terminal at a time. The plurality of resources are used to repeatedly transmit a same transport block (transport block, TB).

In addition, in the repeated transmission technology, to enable the repeatedly transmitted TB to get through different channel environments, different quasi co-location (quasi-co-location, QCL) assumptions may be used for the plurality of resources. Therefore, robustness of transmission of the TB may be further improved.

However, during actual application, the plurality of resources indicated by the network device may include a resource occupied by another channel or signal, or one of the plurality of resources may include symbols in different slots. Consequently, a resource actually used to repeatedly transmit the TB is inconsistent with the resource indicated by the network device. In this case, a QCL assumption corresponding to a resource determined by the network device to be actually used may be inconsistent with a QCL assumption corresponding to the resource determined by the terminal to be actually used, thereby affecting communication reliability and accuracy.

SUMMARY

This application provides a wireless communication method and a communication apparatus, to improve communication reliability and accuracy.

According to a first aspect, a wireless communication method is provided. The method may be performed by a terminal device or a module (for example, a chip) configured in the terminal device. An example in which the method is performed by the terminal device is used for description below.

The method includes: The terminal receives first indication information, where the first indication information is used to indicate m first symbol groups, m is an integer greater than or equal to 2, and the m first symbol groups are used for repeated transmission of a first transport block TB. The terminal determines a quasi co-location QCL assumption corresponding to each of n second symbol groups based on a first mapping relationship, where the n second symbol groups are symbol groups actually used when the terminal sends or receives the first TB, and n is an integer greater than or equal to 1. The terminal sends or receives the first TB by using the n second symbol groups and the QCL assumption corresponding to each of the n second symbol groups.

Alternatively, the method includes: The terminal receives first indication information, where the first indication information is used to indicate m first symbol groups, m is an integer greater than or equal to 2, and the m first symbol groups are used for repeated transmission of a first transport block TB. The terminal receives second indication information, where the second indication information is used to indicate P quasi co-location QCL assumptions, and P is an integer greater than 1. The terminal determines a mapping relationship between n second symbol groups and the P QCL assumptions, where one of the n second symbol groups corresponds to one of the P QCL assumptions, the n second symbol groups are symbol groups actually used when the terminal sends or receives the first TB, and n is an integer greater than or equal to 1. The terminal sends or receives the first TB by using the n second symbol groups and a QCL assumption corresponding to each of the n second symbol groups.

Based on this solution of this application, the m first symbol groups are determined by using the first indication information, then the n second symbol groups actually used to send one TB are determined based on a slot to which each symbol included in the m first symbol groups belongs and a symbol occupied by another signal, and then the QCL assumption corresponding to each of the n second symbol groups actually used to send the TB is determined based on a correspondence between the n second symbol groups and the indicated QCL assumptions, so that a network device and the terminal device reach a consensus and can correctly send and receive repeatedly transmitted data, and therefore reliability is improved.

With reference to the first aspect, in some implementations of the first aspect, symbol distribution of the n second symbol groups is different from symbol distribution of the m first symbol groups.

It should be noted that "symbol distribution of the n second symbol groups is different from symbol distribution of the m first symbol groups" may include but is not limited to the following meanings.

Meaning 1: The m first symbol groups include at least one cross-slot first symbol group, the cross-slot first symbol group includes a first symbol and a second symbol that belong to different slots, and the first symbol and the second symbol belong to different second symbol groups.

Specifically, it is assumed that a symbol X and a symbol Y exist in the m first symbol groups, the symbol X and the symbol Y belong to a same first symbol group, and the symbol X and the symbol Y belong to different slots. In this case, the symbol X and the symbol Y belong to different second symbol groups in the n second symbol groups.

For example, when symbol distribution includes distribution described in the meaning 1, a value of m may be less than n.

Meaning 2: The n second symbol groups do not include a symbol in a discarded first symbol group in the m first symbol groups.

In other words, the first TB is carried on a first signal, and the n second symbol groups include a symbol that is in a first symbol group in the m first symbol groups and used to carry the first signal, but do not include a symbol that is in a first symbol group in the m first symbol groups and used to carry a second signal.

Specifically, a first symbol group (denoted as a first symbol group W) that cannot be used by the terminal in an actual transmission process may exist in the m first symbol groups. In this case, the n second symbol groups do not include a symbol in the first symbol group W.

For example, when symbol distribution includes distribution described in the meaning 1, a value of m may be greater than n.

By way of example, and not limitation, reasons why the first symbol group W cannot be used by the terminal in the actual transmission process may include but are not limited to the following reasons.

For example, the first TB is a TB for uplink transmission, and all or a part of symbols in the first symbol group W are occupied by downlink transmission. In other words, the first signal is an uplink signal, and the second signal is a downlink signal.

For another example, the first TB is a TB for downlink transmission, and all or a part of symbols in the first symbol group W are occupied by uplink transmission. In other words, the first signal is a downlink signal, and the second signal is an uplink signal.

For another example, the first TB has a first priority, and all or a part of symbols in the first symbol group W are occupied by transmission having a second priority. In other words, a priority of the first signal is different from a priority of the second signal.

For another example, all or a part of symbols in the first symbol group W are occupied by another terminal. In other words, the first signal and the second signal correspond to different terminal devices.

Based on this solution, both the network device and the terminal device consider that the first symbol group that includes the symbol carrying the second signal is not used to send the first TB, so that the network device and the terminal device reach a consensus, and therefore can correctly send and receive the first TB.

Optionally, symbols included in each of the m first symbol groups are consecutive in time domain.

Optionally, there may be R interval symbols between any two adjacent first symbol groups in the m first symbol groups.

A value of R may be indicated by the network device, or may be specified by a communication system or a communication protocol.

In addition, there may be no interval symbol between two adjacent second symbol groups in the n second symbol groups, that is, the interval symbol may be classified into the second symbol group.

Therefore, it is assumed that all first symbol groups except the discarded first symbol group in the m first symbol groups include a symbols in total. In this case, because the second symbol group includes the foregoing interval symbol, a quantity of symbols included in the n second symbol groups is greater than a. Therefore, impact on transmission of the first TB that is caused by discarding some specific first symbol groups can be reduced.

Meaning 3: The m first symbol groups not only include the at least one cross-slot first symbol group mentioned in the meaning 1, but also include the first symbol group that needs to be discarded mentioned in the meaning 2.

For example, when symbol distribution includes distribution described in the meaning 3, a value of m may be greater than n, less than n, or equal to n.

With reference to the first aspect, in some implementations of the first aspect, the method further includes: The terminal receives second indication information, where the second indication information is used to indicate P QCL assumptions. The first mapping relationship is a correspondence between the n second symbol groups and the P QCL assumptions.

Optionally, the P QCL assumptions are sequentially and cyclically mapped to the n second symbol groups.

For example, it is assumed that P is 2, the $1^{st}$ QCL in the P QCLs indicated by the second indication information is denoted as A, and the $2^{nd}$ QCL in the P QCLs indicated by the second indication information is denoted as B. In this case, A is first mapped to the $1^{st}$ second symbol group, B is mapped to the $2^{nd}$ second symbol group, A is then mapped to the $3^{nd}$ second symbol group, B is then mapped to the $4^{th}$ second symbol group, and mapping is sequentially and cyclically performed until an $n^{th}$ second symbol group is mapped to. In this case, QCL assumptions corresponding to the n second symbol groups may be represented as ABAB . . . AB.

For another example, it is assumed that P is 3, the $1^{st}$ QCL in the P QCLs indicated by the second indication information is denoted as A, the $2^{nd}$ QCL in the P QCLs indicated by the second indication information is denoted as B, and the $3^{rd}$ QCL in the P QCLs indicated by the second indication information is denoted as C. In this case, A is first mapped to the $1^{st}$ second symbol group, B is mapped to the $2^{nd}$ second symbol group, C is then mapped to the $3^{rd}$ second symbol group, A is then mapped to the $4^{th}$ second symbol group, and mapping is sequentially and cyclically performed until an $n^{th}$ second symbol group is mapped to. In this case, QCL assumptions corresponding to the n second symbol groups may be represented as ABCABC . . . ABC.

In other words, two adjacent second symbol groups correspond to different QCL assumptions.

With reference to the first aspect, the m first symbol groups are used for repeated transmission of the first transport block TB.

Optionally, data carried on the m first symbol groups corresponds to a same HARQ process and a same HARQ process number.

Optionally, the data carried on the m first symbol groups corresponds to a same HARQ feedback bit.

Optionally, each of the m first symbol groups carries all information bits of the first TB.

Optionally, data carried on the n second symbol groups corresponds to a same HARQ process and a same HARQ process number.

Optionally, the data carried on the n second symbol groups corresponds to a same HARQ feedback bit.

Optionally, each of the n second symbol groups carries all the information bits of the first TB.

With reference to the first aspect, the method further includes: The terminal device determines the first mapping relationship based on the n second symbol groups and the second indication information, where the first mapping relationship is used to indicate that each of the n second symbol groups corresponds to one of the P QCL assumptions.

By way of example, and not limitation, the mapping relationship between the n second symbol groups and the P QCLs in this application may include but is not limited to the following mapping modes:

Mapping mode A: The P QCL assumptions are sequentially and cyclically mapped to the n second symbol groups.

For example, the terminal device receives the first indication information indicating the m=8 first symbol groups, where first symbol groups #1 to #8 in the m=8 first symbol groups sequentially occupy eight time units #1 to #8 in time domain, and the terminal device determines that time domain resources actually occupied for transmission are the n second symbol groups #1 to #4 that sequentially occupy two time units in time domain and respectively correspond to four time units #1, #3, #5, and #7 occupied by the m first symbol groups. The terminal device receives the second indication information and determines two QCL assumptions {QCL assumption 1, QCL assumption 2}. Further, the terminal device determines that the first mapping relationship is that the second symbol groups #1 to #4 sequentially correspond to the QCL assumption 1, the QCL assumption 2, the QCL assumption 1, and the QCL assumption 2, or correspond to the QCL assumption 2, the QCL assumption 1, the QCL assumption 2, and the QCL assumption 1.

Sequential and cyclic mapping means: When a quantity P of QCL assumptions is equal to a quantity of second symbol groups, each second symbol group corresponds to one different QCL assumption. When a quantity P of QCL assumptions is less than a quantity of second symbol groups, the first P second symbol groups respectively correspond to the P QCL assumptions, where for example, a second symbol group k corresponds to a QCL assumption k, and k∈{1, . . . , P}; and P second symbol groups starting from a $(P+1)^{th}$ second symbol group sequentially correspond to the P QCL assumptions, where for example, a second symbol group P+k corresponds to the QCL assumption k, and a second symbol group 2P+k corresponds to the QCL assumption k.

Mapping mode B: The P QCL assumptions are mapped to the n second symbol groups in a centralized manner.

For example, the terminal device receives the first indication information indicating the m=8 first symbol groups, where first symbol groups #1 to #8 in the m=8 first symbol groups sequentially occupy eight time units #1 to #8 in time domain, and the terminal device determines that time domain resources actually occupied for transmission are the n second symbol groups #1 to #4 that sequentially occupy two time units in time domain and respectively correspond to four time units #1, #3, #5, and #7 occupied by the m first symbol groups. The terminal device receives the second indication information and determines two QCL assumptions {QCL assumption 1, QCL assumption 2}. Further, the terminal device determines that the first mapping relationship is that the second symbol groups #1 to #4 sequentially correspond to the QCL assumption 1, the QCL assumption 1, the QCL assumption 2, and the QCL assumption 2, or correspond to the QCL assumption 2, the QCL assumption 2, the QCL assumption 1, and the QCL assumption 1.

Centralized mapping means: When a quantity P of QCL assumptions is equal to a quantity of second symbol groups, each second symbol group corresponds to one different QCL assumption. When a quantity P of QCL assumptions is less than a quantity of second symbol groups, the second symbol groups are classified into P parts, and each part corresponds to one different QCL assumption. When the quantity K of second symbol groups is an integer multiple of the quantity P of QCL assumptions, each part includes K/P second symbol groups. When the quantity K of second symbol groups is not an integer multiple of the quantity P of QCL assumptions, the first $$\left\lceil \frac{K}{P} \right\rceil - 1$$

parts each include K/P second symbol groups, a $$\left\lceil \frac{K}{P} \right\rceil^{th}$$

part includes $$K - \left(\left\lceil \frac{K}{P} \right\rceil - 1\right) \times P$$

second symbol groups, and all second symbol groups in a $k^{th}$ second symbol group correspond to a QCL assumption k, where k∈(1, . . . , P).

With reference to the first aspect, the n second symbol groups are symbol groups actually used when the terminal sends or receives the first TB. The actually used symbol group indicates that each symbol occupied by the n second symbol groups is used to carry the first TB.

Optionally, the m first symbol groups are different from the n second symbol groups.

Optionally, a quantity m is different from a quantity n, and time domain resources occupied by the m first symbol groups include time domain resources occupied by the n first symbol groups.

Optionally, n=m−k, k is an integer greater than 0 and less than m, and n first symbol groups sequentially correspond to m−k second symbol groups. Sequential correspondence means that a time domain resource occupied by an $i^{th}$ first symbol group is the same as a time domain resource occupied by a $j^{th}$ second symbol group, where i∈{1, . . . , n}, and the $j^{th}$ second symbol group belongs to the m−k second symbol groups in the m second symbol groups.

Optionally, each of k second symbol groups other than the m−k second symbol groups includes at least one uplink symbol, at least one RE occupied by a reference signal RS, and/or at least one RE preempted by another service.

Optionally, the first mapping relationship is specifically used to indicate a one-to-one correspondence between the n second symbol groups and n QCL assumptions in a first QCL assumption sequence, and the first QCL assumption sequence is generated based on the P QCL assumptions.

For example, the first QCL assumption sequence is generated after the P QCL assumptions are cyclically and repeatedly arranged.

For example, it is assumed that P is 2, the $1^{st}$ QCL in the P QCLs indicated by the second indication information is denoted as A, and the $2^{nd}$ QCL in the P QCLs indicated by the second indication information is denoted as B. In this case, the first QCL assumption sequence may be represented as ABAB . . . AB.

For another example, it is assumed that P is 3, the $1^{st}$ QCL in the P QCLs indicated by the second indication information is denoted as A, the $2^{nd}$ QCL in the P QCLs indicated by the second indication information is denoted as B, and the $3^{rd}$ QCL in the P QCLs indicated by the second indication information is denoted as C. In this case, the first QCL assumption sequence may be represented as ABCABC . . . ABC.

Based on this solution, the indicated P QCL assumptions are cyclically and repeatedly arranged in a preset sequence to generate the n QCL assumptions, and the n QCL assumptions are in a one-to-one correspondence with the n second symbol groups actually used for repeated transmission of the first TB. During actual repeated transmission, different QCL assumptions are alternately used as much as possible, so that the TB is enabled to get through different channel environments, and therefore robustness of transmission of the TB is further improved.

With reference to the first aspect, in some implementations of the first aspect, the method further includes: The terminal receives third indication information, where the third indication information is used to indicate the discarded symbol group in the m first symbol groups, and the n second symbol groups do not include the symbol in the discarded first symbol group in the m first symbol groups.

With reference to the first aspect, in some implementations of the first aspect, the first indication information is carried in downlink control information DCI.

With reference to the first aspect, in some implementations of the first aspect, the method further includes: The terminal receives third indication information, where the third indication information is used to indicate the discarded symbol group in the m first symbol groups, and the n second symbol groups do not include the symbol in the discarded first symbol group in the m first symbol groups.

With reference to the first aspect, in some implementations of the first aspect, the first indication information is carried in a radio resource control RRC message.

With reference to the first aspect, in some implementations of the first aspect, the second indication information is carried in downlink control information DCI.

With reference to the first aspect, in some implementations of the first aspect, the second indication information is carried in a radio resource control RRC message.

That is, in this application, the first information and the second information may be carried in a same piece of information or a same message. In other words, the first information and the second information may be transmitted synchronously.

Alternatively, in this application, the first information and the second information may be carried in different pieces of information or different messages. In other words, the first information and the second information may be transmitted asynchronously.

With reference to the first aspect, in some implementations of the first aspect, each of the n second symbol groups is further used to carry a demodulation reference signal DMRS.

A QCL assumption of the DMRS is the same as a QCL assumption corresponding to the second symbol group carrying the DMRS.

In addition, for example, if two adjacent second symbol groups correspond to different QCLs, DMRSs carried on the two adjacent second symbol groups are also different.

Based on this solution, because each second symbol group carries the DMRS, even if the first TB gets through different channel environments because different QCL assumptions are used when the first TB is sent on the n second symbol groups, channel information can be accurately obtained, and data can be correctly demodulated.

Optionally, each QCL assumption corresponds to one source reference signal, and the QCL assumption corresponding to each second symbol group is used to indicate a spatial characteristic parameter of a reference signal used by an uplink signal corresponding to the second symbol group that is the same as a spatial characteristic parameter of a source reference signal corresponding to the QCL assumption.

Optionally, the QCL assumption corresponding to each second symbol group is used to indicate a spatial characteristic parameter of a reference signal corresponding to the second symbol group.

The reference signal corresponding to the second symbol group includes a reference signal of an uplink channel corresponding to the second symbol group.

According to a second aspect, a wireless communication method is provided. The method may be performed by a network device or a module (for example, a chip) configured in the network device. An example in which the method is performed by the network device is used for description below.

The method includes: The network device sends first indication information, where the first indication information is used to indicate m first symbol groups, m is an integer greater than or equal to 2, and the m first symbol groups are used for repeated transmission of a first transport block TB. The network device determines a quasi co-location QCL assumption corresponding to each of n second symbol groups based on a first mapping relationship, where the n second symbol groups are symbol groups actually used when the network device sends or receives the first TB, and n is an integer greater than or equal to 1. The network device sends or receives the first TB by using the n second symbol groups and the QCL assumption corresponding to each of the n second symbol groups.

Alternatively, the method includes: The network device sends first indication information, where the first indication information is used to indicate m first symbol groups, m is an integer greater than or equal to 2, and the m first symbol groups are used for repeated transmission of a first transport block TB. The network device sends second indication information, where the second indication information is used to indicate P quasi co-location QCL assumptions, and P is an integer greater than 1. The network device determines a mapping relationship between n second symbol groups and the P QCL assumptions, where one of the n second symbol groups corresponds to one of the P QCL assumptions, the n second symbol groups are symbol groups actually used when a terminal sends or receives the first TB, and n is an integer greater than or equal to 1. The network device sends or receives the first TB by using the n second symbol groups and a QCL assumption corresponding to each of the n second symbol groups.

Based on this solution of this application, the m first symbol groups are determined by using the first indication information, then the n second symbol groups actually used to send one TB are determined based on a slot to which each symbol included in the m first symbol groups belongs and a symbol occupied by another signal, and then the QCL assumption corresponding to each of the n second symbol groups actually used to send the TB is determined based on a correspondence between the n second symbol groups and the indicated QCL assumptions, so that the network device and the terminal device reach a consensus and can correctly send and receive repeatedly transmitted data, and therefore reliability is improved.

With reference to the first aspect, in some implementations of the first aspect, symbol distribution of the n second symbol groups is different from symbol distribution of the m first symbol groups.

It should be noted that "symbol distribution of the n second symbol groups is different from symbol distribution of the m first symbol groups" may include but is not limited to the meaning 1, the meaning 2, or the meaning 3 mentioned in the first aspect.

With reference to the second aspect, in some implementations of the second aspect, the method further includes: The network device sends second indication information, where the second indication information is used to indicate P QCL assumptions. The first mapping relationship is a correspondence between the n second symbol groups and the P QCL assumptions.

Optionally, the P QCL assumptions are sequentially and cyclically mapped to the n second symbol groups.

For example, it is assumed that P is 2, the $1^{st}$ QCL in the P QCLs indicated by the second indication information is denoted as A, and the $2^{nd}$ QCL in the P QCLs indicated by the second indication information is denoted as B. In this case, A is first mapped to the $1^{st}$ second symbol group, B is mapped to the $2^{nd}$ second symbol group, A is then mapped to the $3^{rd}$ second symbol group, B is then mapped to the $4^{th}$ second symbol group, and mapping is sequentially and cyclically performed until an $n^{th}$ second symbol group is mapped to. In this case, QCL assumptions corresponding to the n second symbol groups may be represented as ABAB . . . AB.

For another example, it is assumed that P is 3, the $1^{st}$ QCL in the P QCLs indicated by the second indication information is denoted as A, the $2^{rd}$ QCL in the P QCLs indicated by the second indication information is denoted as B, and the $3^{rd}$ QCL in the P QCLs indicated by the second indication information is denoted as C. In this case, A is first mapped to the $1^{st}$ second symbol group, B is mapped to the $2^{nd}$ second symbol group, C is then mapped to the $3^{rd}$ second symbol group, A is then mapped to the $4^{th}$ second symbol group, and mapping is sequentially and cyclically performed until an $n^{th}$ second symbol group is mapped to. In this case, QCL assumptions corresponding to the n second symbol groups may be represented as ABCABC . . . ABC.

Optionally, the first mapping relationship is specifically used to indicate a one-to-one correspondence between the n second symbol groups and n QCL assumptions in a first QCL assumption sequence, and the first QCL assumption sequence is generated based on the P QCL assumptions.

For example, the first QCL assumption sequence is generated after the P QCL assumptions are cyclically and repeatedly arranged.

For example, it is assumed that P is 2, the $1^{st}$ QCL in the P QCLs indicated by the second indication information is denoted as A, and the $2^{rd}$ QCL in the P QCLs indicated by the second indication information is denoted as B. In this case, the first QCL assumption sequence may be represented as ABAB . . . AB.

For another example, it is assumed that P is 3, the $1^{st}$ QCL in the P QCLs indicated by the second indication information is denoted as A, the $2^{nd}$ QCL in the P QCLs indicated by the second indication information is denoted as B, and the $3^{rd}$ QCL in the P QCLs indicated by the second indication information is denoted as C. In this case, the first QCL assumption sequence may be represented as ABCABC . . . ABC.

Based on this solution, the indicated P QCL assumptions are cyclically and repeatedly arranged in a preset sequence to generate the n QCL assumptions, and the n QCL assumptions are in a one-to-one correspondence with the n second symbol groups actually used for repeated transmission of the first TB. During actual repeated transmission, different QCL assumptions are alternately used as much as possible, so that the TB is enabled to get through different channel environments, and therefore robustness of transmission of the TB is further improved.

With reference to the second aspect, the m first symbol groups are used for repeated transmission of the first transport block TB.

Optionally, data carried on the m first symbol groups corresponds to a same HARQ process and a same HARQ process number.

Optionally, the data carried on the m first symbol groups corresponds to a same HARQ feedback bit.

Optionally, each of the m first symbol groups carries all information bits of the first TB.

With reference to the second aspect, the method further includes: The terminal device determines the first mapping relationship based on the n second symbol groups and the second indication information, where the first mapping relationship is used to indicate that each of the n second symbol groups corresponds to one of the P QCL assumptions.

By way of example, and not limitation, the mapping relationship between the n second symbol groups and the P QCLs in this application may include but is not limited to the mapping mode A or the mapping mode B.

With reference to the second aspect, the n second symbol groups are symbol groups actually used when the terminal sends or receives the first TB. The actually used symbol group indicates that each symbol occupied by the n second symbol groups is used to carry the first TB.

Optionally, the m first symbol groups are different from the n second symbol groups.

Optionally, a quantity m is different from a quantity n, and time domain resources occupied by the m first symbol groups include time domain resources occupied by the n first symbol groups.

Optionally, n=m−k, k is an integer greater than 0 and less than m, and n first symbol groups sequentially correspond to m−k second symbol groups. Sequential correspondence means that a time domain resource occupied by an $i^{th}$ first symbol group is the same as a time domain resource occupied by a $j^{th}$ second symbol group, where i∈{1, . . . , n}, and the $j^{th}$ second symbol group belongs to the m−k second symbol groups in the m second symbol groups.

Optionally, each of k second symbol groups other than the m−k second symbol groups includes at least one uplink symbol, at least one RE occupied by a reference signal RS, and/or at least one RE preempted by another service.

With reference to the second aspect, in some implementations of the second aspect, the method further includes: The terminal receives third indication information, where the third indication information is used to indicate a discarded symbol group in the m first symbol groups, and the n second symbol groups do not include a symbol in the discarded first symbol group in the m first symbol groups.

With reference to the second aspect, in some implementations of the second aspect, the first indication information is carried in downlink control information DCI.

With reference to the second aspect, in some implementations of the second aspect, the first indication information is carried in a radio resource control RRC message.

With reference to the second aspect, in some implementations of the second aspect, the second indication information is carried in downlink control information DCI.

With reference to the second aspect, in some implementations of the second aspect, the second indication information is carried in a radio resource control RRC message.

That is, in this application, the first information and the second information may be carried in a same piece of information or a same message. In other words, the first information and the second information may be transmitted synchronously.

Alternatively, in this application, the first information and the second information may be carried in different pieces of information or different messages. In other words, the first information and the second information may be transmitted asynchronously.

With reference to the second aspect, in some implementations of the second aspect, each of the n second symbol groups is further used to carry a demodulation reference signal DMRS.

A QCL assumption of the DMRS is the same as a QCL assumption corresponding to the second symbol group carrying the DMRS.

In addition, for example, if two adjacent second symbol groups correspond to different QCLs, DMRSs carried on the two adjacent second symbol groups are also different.

Based on this solution, because each second symbol group carries the DMRS, even if the first TB gets through different channel environments because different QCL assumptions are used when the first TB is sent on the n second symbol groups, channel information can be accurately obtained, and data can be correctly demodulated.

Optionally, each QCL assumption corresponds to one source reference signal, and the QCL assumption corresponding to each second symbol group is used to indicate a spatial characteristic parameter of a reference signal used by an uplink signal corresponding to the second symbol group that is the same as a spatial characteristic parameter of a source reference signal corresponding to the QCL assumption.

Optionally, the QCL assumption corresponding to each second symbol group is used to indicate a spatial characteristic parameter of a reference signal corresponding to the second symbol group.

The reference signal corresponding to the second symbol group includes a reference signal of an uplink channel corresponding to the second symbol group.

According to a third aspect, a wireless communication method is provided. The method may be performed by a terminal device or a module (for example, a chip) configured in the terminal device. An example in which the method is performed by the terminal device is used for description below.

The method includes: The terminal receives first indication information, where the first indication information is used to indicate m first symbol groups, m is an integer greater than or equal to 2, the m first symbol groups are used for repeated transmission of a first TB, and each first symbol group includes at least one symbol. The terminal receives second indication information, where the second indication information is used to indicate P QCL assumptions, and each of the m first symbol groups corresponds to one QCL assumption. The terminal sends or receives the first TB by using n second symbol groups and a QCL assumption corresponding to each of the n second symbol groups, where n is an integer greater than or equal to 1, the n second symbol groups are symbol groups actually used when the terminal sends or receives the first TB, each of the n second symbol groups corresponds to one first symbol group, a symbol in each second symbol group belongs to the corresponding first symbol group, and a second symbol group and a first symbol group that correspond to each other correspond to a same QCL assumption.

Alternatively, the method includes: The terminal receives first indication information, where the first indication information is used to indicate m first symbol groups, m is an integer greater than or equal to 2, the m first symbol groups are used for repeated transmission of a first TB, and each first symbol group includes at least one symbol. The terminal receives second indication information, where the second indication information is used to indicate P QCL assumptions. The terminal determines a correspondence between the m first symbol groups and the P QCL assumptions based on the first indication information and the second indication information, where one of the m first symbol groups corresponds to one of the P QCL assumptions. The terminal sends or receives the first TB by using n second symbol groups and a QCL assumption corresponding to each of the n second symbol groups, where n is an integer greater than or equal to 1, the n second symbol groups are symbol groups actually used when the terminal sends or receives the first TB, one of the n second symbol groups corresponds to one first symbol group, a symbol in each second symbol group belongs to a corresponding first symbol group, and a second symbol group and a first symbol group that correspond to each other correspond to a same QCL assumption.

Based on this solution of this application, it is defined that each of the n second symbol groups actually used to send the first TB uses a QCL assumption of the first symbol group corresponding to the second symbol group, so that a case in which a network device and the terminal device have inconsistent understandings on QCL assumptions used for different repeated transmissions is avoided.

It should be noted that "symbol distribution of the n second symbol groups is different from symbol distribution of the m first symbol groups" may include but is not limited to the meaning 1, the meaning 2, or the meaning 3 mentioned in the first aspect.

With reference to the third aspect, the m first symbol groups are used for repeated transmission of the first transport block TB.

Optionally, data carried on the m first symbol groups corresponds to a same HARQ process and a same HARQ process number.

Optionally, the data carried on the m first symbol groups corresponds to a same HARQ feedback bit.

Optionally, each of the m first symbol groups carries all information bits of the first TB.

With reference to the third aspect, the method further includes: The terminal device determines a first mapping relationship based on the m first symbol groups and the second indication information, where the first mapping relationship is used to indicate that each of the m first symbol groups corresponds to one of the P QCL assumptions.

By way of example, and not limitation, the mapping relationship between the m second symbol groups and the P QCLs in this application may include but is not limited to the following mapping modes:

Mapping mode C: The P QCL assumptions are sequentially and cyclically mapped to the m first symbol groups.

For example, the terminal device receives the first indication information indicating the m=8 first symbol groups, where first symbol groups #1 to #8 in the m=8 first symbol groups sequentially occupy eight time units #1 to #8 in time domain. The terminal device receives the second indication information and determines two QCL assumptions {QCL assumption 1, QCL assumption 2}. Further, the terminal device determines that the first mapping relationship is that the first symbol groups #1 to #8 sequentially correspond to the QCL assumption 1, the QCL assumption 2, the QCL assumption 1, the QCL assumption 2, the QCL assumption 1, the QCL assumption 2, the QCL assumption 1, and the QCL assumption 2, or correspond to the QCL assumption 2, the QCL assumption 1, the QCL assumption 2, the QCL assumption 1, the QCL assumption 2, the QCL assumption 1, the QCL assumption 2, and the QCL assumption 1.

Sequential and cyclic mapping means: When a quantity P of QCL assumptions is equal to a quantity of first symbol groups, each first symbol group corresponds to one different QCL assumption. When a quantity P of QCL assumptions is less than a quantity of second symbol groups, the first P first symbol groups respectively correspond to the P QCL assumptions, where for example, a first symbol group k corresponds to a QCL assumption k, and k∈{1, . . . , P}; and P first symbol groups starting from a $(P+1)^{th}$ first symbol group sequentially correspond to the P QCL assumptions, where for example, a first symbol group P+k corresponds to the QCL assumption k, and a first symbol group 2P+k corresponds to the QCL assumption k.

Mapping mode D: The P QCL assumptions are mapped to the m first symbol groups in a centralized manner.

For example, the terminal device receives the first indication information indicating the m=4 first symbol groups, where first symbol groups #1 to #4 in the m=4 first symbol groups sequentially occupy four time units #1 to #4 in time domain. The terminal device receives the second indication information and determines two QCL assumptions {QCL assumption 1, QCL assumption 2}. Further, the terminal device determines that the first mapping relationship is that the first symbol groups #1 to #4 sequentially correspond to the QCL assumption 1, the QCL assumption 1, the QCL assumption 2, and the QCL assumption 2, or correspond to the QCL assumption 2, the QCL assumption 2, the QCL assumption 1, and the QCL assumption 1.

Centralized mapping means: When a quantity P of QCL assumptions is equal to a quantity of first symbol groups, each first symbol group corresponds to one different QCL assumption. When a quantity P of QCL assumptions is less than a quantity of first symbol groups, the first symbol groups are classified into P parts, and each part corresponds to one different QCL assumption. When the quantity K of first symbol groups is an integer multiple of the quantity P of QCL assumptions, each part includes K/P first symbol groups. When the quantity K of first symbol groups is not an integer multiple of the quantity P of QCL assumptions, the first $$\left\lceil \frac{K}{P} \right\rceil - 1$$

parts each include K/P first symbol groups, a $$\left\lceil \frac{K}{P} \right\rceil^{th}$$

part includes $$K - \left( \left\lceil \frac{K}{P} \right\rceil - 1 \right) \times P$$

first symbol groups, and all first symbol groups in a $k^{th}$ first symbol group correspond to a QCL assumption k, where k∈{1, . . . , P}.

With reference to the third aspect, the n second symbol groups are symbol groups actually used when the terminal sends or receives the first TB. The actually used symbol group indicates that each symbol occupied by the n second symbol groups is used to carry the first TB.

Optionally, the m first symbol groups are different from the n second symbol groups.

Optionally, a quantity m is different from a quantity n, and time domain resources occupied by the m first symbol groups include time domain resources occupied by the n first symbol groups.

Optionally, n=m−k, k is an integer greater than 0 and less than m, and n first symbol groups sequentially correspond to m−k second symbol groups. Sequential correspondence means that a time domain resource occupied by an $i^{th}$ first symbol group is the same as a time domain resource occupied by a $j^{th}$ second symbol group, where i∈{1, . . . , n}, and the $j^{th}$ second symbol group belongs to the m−k second symbol groups in the m second symbol groups.

Optionally, each of k second symbol groups other than the m−k second symbol groups includes at least one uplink symbol, at least one RE occupied by a reference signal RS, and/or at least one RE preempted by another service.

With reference to the third aspect, in some implementations of the third aspect, the m first symbol groups include at least one cross-slot first symbol group, the cross-slot first symbol group includes a first symbol and a second symbol that occupy different slots, and the first symbol and the second symbol belong to different second symbol groups.

Based on this solution, when a first symbol group includes symbol groups in different slots, both the network device and the terminal device consider that the first symbol group is divided into two second symbol groups by a slot boundary, and the first TB is sent once by using each of the two second symbol groups, so that the network device and the terminal device reach a consensus on a symbol group resource used for repeated transmission, and therefore can correctly send and receive the first TB.

For example, it is assumed that a first symbol group x includes symbols belonging to different slots, and the symbols located in different slots respectively belong to a second symbol group y and a second symbol group z, that is, both the second symbol group y and the second symbol group z correspond to the first symbol group x. Therefore, QCLs corresponding to the second symbol group y and the second symbol group z are both a QCL corresponding to the first symbol group x.

By way of example, and not limitation, in this case, in this application, the second symbol group y and the second symbol group z may share a same DMRS. In other words, the DMRS may be carried on one of the second symbol group y and the second symbol group z. Therefore, DMRS resource overheads can be reduced.

That is, the m first symbol groups include the at least one cross-slot first symbol group, the cross-slot first symbol group includes the first symbol and the second symbol that occupy different slots, the first symbol and the second symbol each correspond to one second symbol group, and two second symbol groups corresponding to a same cross-slot first symbol group share a same demodulation reference signal DMRS.

In addition, in this application, for any two symbols A and B, if the symbol A and the symbol B belong to a same first symbol group, the symbol A and the symbol B may share a same DMRS regardless of whether the symbol A and the symbol B belong to a same second symbol group.

With reference to the third aspect, in some implementations of the third aspect, the first indication information is carried in downlink control information DCI.

With reference to the third aspect, in some implementations of the third aspect, the first indication information is carried in a radio resource control RRC message.

With reference to the third aspect, in some implementations of the third aspect, the second indication information is carried in downlink control information DCI.

With reference to the third aspect, in some implementations of the third aspect, the second indication information is carried in a radio resource control RRC message.

That is, in this application, the first information and the second information may be carried in a same piece of information or a same message. In other words, the first information and the second information may be transmitted synchronously.

Alternatively, in this application, the first information and the second information may be carried in different pieces of information or different messages. In other words, the first information and the second information may be transmitted asynchronously.

According to a fourth aspect, a wireless communication method is provided. The method may be performed by a network device or a module (for example, a chip) configured in the network device. An example in which the method is performed by the terminal device is used for description below.

The method includes: The network device sends first indication information, where the first indication information is used to indicate m first symbol groups, m is an integer greater than or equal to 2, the m first symbol groups are used for repeated transmission of a first TB, and each first symbol group includes at least one symbol. The network device sends second indication information, where the second indication information is used to indicate a QCL assumption corresponding to each of the m first symbol groups. The network device sends or receives the first TB by using n second symbol groups and a QCL assumption corresponding to each of the n second symbol groups, where n is an integer greater than or equal to 1, the n second symbol groups are symbol groups actually used when a terminal sends or receives the first TB, each of the n second symbol groups corresponds to one first symbol group, a symbol in each second symbol group belongs to the corresponding first symbol group, and a second symbol group and a first symbol group that correspond to each other correspond to a same QCL assumption.

Alternatively, the method includes: The network device sends first indication information, where the first indication information is used to indicate m first symbol groups, m is an integer greater than or equal to 2, the m first symbol groups are used for repeated transmission of a first TB, and each first symbol group includes at least one symbol. The network device sends second indication information, where the second indication information is used to indicate P QCL assumptions. The network device determines a correspondence between the m first symbol groups and the P QCL assumptions based on the first indication information and the second indication information, where one of the m first symbol groups corresponds to one of the P QCL assumptions. The network device sends or receives the first TB by using n second symbol groups and a QCL assumption corresponding to each of the n second symbol groups, where n is an integer greater than or equal to 1, the n second symbol groups are symbol groups actually used when a terminal sends or receives the first TB, one of the n second symbol groups corresponds to one first symbol group, a symbol in each second symbol group belongs to a corresponding first symbol group, and a second symbol group and a first symbol group that correspond to each other correspond to a same QCL assumption.

Optionally, the terminal device determines a QCL assumption of each of n symbol groups B based on a mapping relationship between m symbol groups A and the P QCL assumptions.

Based on this solution of this application, it is defined that each of the n second symbol groups actually used to send the first TB uses a QCL assumption of the first symbol group corresponding to the second symbol group, so that a case in which the network device and the terminal device have inconsistent understandings on QCL assumptions used for different repeated transmissions is avoided.

It should be noted that "symbol distribution of the n second symbol groups is different from symbol distribution of the m first symbol groups" may include but is not limited to the meaning 1, the meaning 2, or the meaning 3 mentioned in the first aspect.

With reference to the fourth aspect, the m first symbol groups are used for repeated transmission of the first transport block TB.

Optionally, data carried on the m first symbol groups corresponds to a same HARQ process and a same HARQ process number.

Optionally, the data carried on the m first symbol groups corresponds to a same HARQ feedback bit.

Optionally, each of the m first symbol groups carries all information bits of the first TB.

With reference to the fourth aspect, the method further includes: The network device determines a first mapping relationship based on the m first symbol groups and the second indication information, where the first mapping relationship is used to indicate that each of the m first symbol groups corresponds to one of the P QCL assumptions.

By way of example, and not limitation, the mapping relationship between the m second symbol groups and the P QCLs in this application may include but is not limited to the mapping mode C or the mapping mode D.

With reference to the fourth aspect, the n second symbol groups are symbol groups actually used when the terminal sends or receives the first TB. The actually used symbol group indicates that each symbol occupied by the n second symbol groups is used to carry the first TB.

Optionally, the m first symbol groups are different from the n second symbol groups.

Optionally, a quantity m is different from a quantity n, and time domain resources occupied by the m first symbol groups include time domain resources occupied by the n first symbol groups.

Optionally, n=m−k, k is an integer greater than 0 and less than m, and n first symbol groups sequentially correspond to m−k second symbol groups. Sequential correspondence means that a time domain resource occupied by an $i^{th}$ first symbol group is the same as a time domain resource occupied by a $j^{th}$ second symbol group, where i∈{1, . . . , n}, and the $j^{th}$ second symbol group belongs to the m−k second symbol groups in the m second symbol groups.

Optionally, each of k second symbol groups other than the m−k second symbol groups includes at least one uplink symbol, at least one RE occupied by a reference signal RS, and/or at least one RE preempted by another service.

With reference to the fourth aspect, in some implementations of the fourth aspect, the m first symbol groups include at least one cross-slot first symbol group, the cross-slot first symbol group includes a first symbol and a second symbol that belong to different slots, and the first symbol and the second symbol belong to different second symbol groups.

Based on this solution, when a first symbol group includes symbol groups in different slots, both the network device and the terminal device consider that the first symbol group is divided into two second symbol groups by a slot boundary, and the first TB is sent once by using each of the two second symbol groups, so that the network device and the terminal device reach a consensus on a symbol group resource used for repeated transmission, and therefore can correctly send and receive the first TB.

For example, it is assumed that a first symbol group x includes symbols belonging to different slots, and the symbols located in different slots respectively belong to a second symbol group y and a second symbol group z, that is, both the second symbol group y and the second symbol group z correspond to the first symbol group x. Therefore, QCLs corresponding to the second symbol group y and the second symbol group z are both a QCL corresponding to the first symbol group x.

By way of example, and not limitation, in this case, in this application, the second symbol group y and the second symbol group z may share a same DMRS. In other words, the DMRS may be carried on one of the second symbol group y and the second symbol group z. Therefore, DMRS resource overheads can be reduced.

That is, the m first symbol groups include the at least one cross-slot first symbol group, the cross-slot first symbol group includes the first symbol and the second symbol that occupy different slots, the first symbol and the second symbol each correspond to one second symbol group, and two second symbol groups corresponding to a same cross-slot first symbol group share a same demodulation reference signal DMRS.

In addition, in this application, for any two symbols A and B, if the symbol A and the symbol B belong to a same first symbol group, the symbol A and the symbol B may share a same DMRS regardless of whether the symbol A and the symbol B belong to a same second symbol group.

With reference to the fourth aspect, in some implementations of the fourth aspect, the first indication information is carried in downlink control information DCI.

With reference to the fourth aspect, in some implementations of the fourth aspect, the first indication information is carried in a radio resource control RRC message.

With reference to the fourth aspect, in some implementations of the fourth aspect, the second indication information is carried in downlink control information DCI.

With reference to the fourth aspect, in some implementations of the fourth aspect, the second indication information is carried in a radio resource control RRC message.

That is, in this application, the first information and the second information may be carried in a same piece of information or a same message. In other words, the first information and the second information may be transmitted synchronously.

Alternatively, in this application, the first information and the second information may be carried in different pieces of information or different messages. In other words, the first information and the second information may be transmitted asynchronously.

According to a fifth aspect, a communication apparatus is provided. The communication apparatus includes modules or units configured to perform the method according to any one of the first aspect or the third aspect and the possible implementations of the first aspect or the third aspect.

According to a sixth aspect, a communication apparatus is provided. The apparatus includes a processor. The processor is coupled to a memory, and may be configured to perform the method according to any one of the first aspect or the third aspect and the possible implementations of the first aspect or the third aspect. Optionally, the communication apparatus further includes the memory. Optionally, the communication apparatus further includes a communication interface, and the processor is coupled to the communication interface.

In an implementation, the communication apparatus is a terminal device. When the communication apparatus is the terminal device, the communication interface may be a transceiver or an input/output interface. Optionally, the transceiver may be a transceiver circuit. Optionally, the input/output interface may be an input/output circuit.

In another implementation, the communication apparatus is a chip or a chip system. When the communication apparatus is the chip or the chip system, the communication interface may be an input/output interface, an interface circuit, an output circuit, an input circuit, a pin, a related circuit, or the like on the chip or the chip system. The processor may alternatively be embodied as a processing circuit or a logic circuit.

According to a seventh aspect, a communication apparatus is provided. The communication apparatus includes modules or units configured to perform the method according to any one of the second aspect or the fourth aspect and the possible implementations of the second aspect or the fourth aspect.

According to an eighth aspect, a communication apparatus is provided. The apparatus includes a processor. The processor is coupled to a memory, and may be configured to execute instructions in the memory, to implement the method according to any one of the second aspect or the fourth aspect and the possible implementations of the second aspect or the fourth aspect. Optionally, the communication apparatus further includes the memory. Optionally, the communication apparatus further includes a communication interface, and the processor is coupled to the communication interface. Optionally, the transceiver may be a transceiver circuit. Optionally, the input/output interface may be an input/output circuit.

In an implementation, the communication apparatus is a network device. When the communication apparatus is the network device, the communication interface may be a transceiver or an input/output interface.

In another implementation, the communication apparatus is a chip or a chip system. When the communication apparatus is the chip or the chip system, the communication interface may be an input/output interface, an interface circuit, an output circuit, an input circuit, a pin, a related circuit, or the like on the chip or the chip system. The processor may alternatively be embodied as a processing circuit or a logic circuit.

According to a ninth aspect, a processor is provided. The processor includes an input circuit, an output circuit, and a processing circuit. The processing circuit is configured to: receive a signal through the input circuit, and transmit a signal through the output circuit, to enable implementation of the method according to any one of the first aspect to the fourth aspect and the possible implementations of the first aspect to the fourth aspect.

In a specific implementation process, the processor may be a chip, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the circuits are not limited in the embodiments of this application.

According to a tenth aspect, a processing apparatus is provided. The processing apparatus includes a processor and a memory. The processor is configured to: read instructions stored in the memory, receive a signal through a receiver, and transmit a signal through a transmitter, to perform the method according to any one of the first aspect to the fourth aspect and the possible implementations of the first aspect to the fourth aspect.

Optionally, there are one or more processors, and there are one or more memories.

Optionally, the memory may be integrated with the processor, or the memory and the processor are separately disposed.

In a specific implementation process, the memory may be a non-transitory (non-transitory) memory, for example, a read-only memory (read-only memory, ROM). The memory and the processor may be integrated on a same chip, or may be separately disposed on different chips. A type of the memory and a manner of disposing the memory and the processor are not limited in the embodiments of this application.

It should be understood that, a related data exchange process such as sending of indication information may be a process of outputting the indication information from the processor, and receiving of capability information may be a process of receiving the input capability information by the processor. Specifically, data output by the processor may be output to the transmitter, and input data received by the processor may be from the receiver. The transmitter and the receiver may be collectively referred to as a transceiver.

The processor in the tenth aspect may be a chip. The processor may be implemented by using hardware or software. When the processor is implemented by using hardware, the processor may be a logic circuit, an integrated circuit, or the like. When the processor is implemented by using software, the processor may be a general-purpose processor, and is implemented by reading software code stored in the memory. The memory may be integrated into the processor, or may exist independently outside the processor.

According to an eleventh aspect, a computer program product is provided. The computer program product includes a computer program (which may also be referred to as code or instructions). When the computer program is run, a computer is enabled to perform the method according to any one of the first aspect to the fourth aspect and the possible implementations of the first aspect to the fourth aspect.

According to a twelfth aspect, a computer-readable medium is provided. The computer-readable medium stores a computer program (which may also be referred to as code or instructions). When the computer program is run on a computer, the computer is enabled to perform the method according to any one of the first aspect to the fourth aspect and the possible implementations of the first aspect to the fourth aspect.

According to a thirteenth aspect, a communication system is provided. The communication system includes the foregoing network device and terminal device.

DETAILED DESCRIPTION OF EMBODIMENTS

Figure 1:
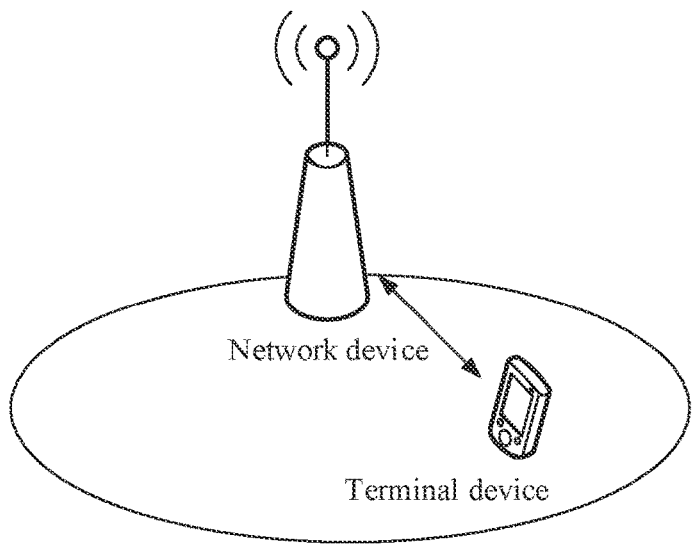
FIG. 1 is a schematic diagram of an architecture of a communication system according to this application.

The following describes technical solutions in this application with reference to the accompanying drawings.

The technical solutions in embodiments of this application may be applied to various communication systems such as a global system for mobile communications (global system for mobile communications, GSM), a code division multiple access (code division multiple access, CDMA) system, a wideband code division multiple access (wideband code division multiple access, WCDMA) system, a general packet radio service (general packet radio service, GPRS) system, a long term evolution (long term evolution, LTE) system, an LTE frequency division duplex (frequency division duplex, FDD) system, an LTE time division duplex (time division duplex, TDD) system, a universal mobile telecommunication system (universal mobile telecommunication system, UMTS), a worldwide interoperability for microwave access (worldwide interoperability for microwave access, WiMAX) communication system, a future 5th generation (5th generation, 5G) system or a new radio (new radio, NR) system, a vehicle-to-everything (vehicle-to-X, V2X) system, a long term evolution-vehicle (Long Term Evolution-Vehicle, LTE-V) system, an internet of vehicles system, a machine type communication (machine type communication, MTC) system, an internet of things (Internet of Things, IoT) system, a long term evolution-machine (Long Term Evolution-Machine, LTE-M) system, and a machine to machine (Machine to Machine, M2M) system, where V2X may include vehicle to network (vehicle to network, V2N), vehicle to vehicle (vehicle to vehicle, V2V), vehicle to infrastructure (vehicle to infrastructure, V2I), vehicle to pedestrian (vehicle to pedestrian, V2P), and the like.

A terminal device in the embodiments of this application may also be referred to as user equipment (user equipment, UE), an access terminal, a subscriber unit, a subscriber station, a mobile station, a mobile console, a remote station, a remote terminal, a mobile device, a user terminal, a terminal, a wireless communication device, a user agent, or a user apparatus. The terminal device in the embodiments of this application may be a mobile phone (mobile phone), a tablet computer (pad), a computer having a wireless transceiver function, a virtual reality (virtual reality, VR) terminal device, an augmented reality (augmented reality, AR) terminal device, a wireless terminal in industrial control (industrial control), a wireless terminal in self driving (self driving), a wireless terminal in telemedicine (remote medical), a wireless terminal in a smart grid (smart grid), a wireless terminal in transportation safety (transportation safety), a wireless terminal in a smart city (smart city), a wireless terminal in a smart home (smart home), a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless communication function, a computing device or another processing device connected to a wireless modem, a vehicle-mounted device, a wearable device, a terminal device in a 5G network, a terminal device in a future evolved public land mobile network (public land mobile network, PLMN), or the like.

The wearable device may also be referred to as a wearable intelligent device, and is a general term for wearable devices such as glasses, gloves, watches, clothes, and shoes that are developed by applying wearable technologies to intelligent designs of daily wear. The wearable device is a portable device that is directly worn on a body or integrated into clothes or an accessory of a user. The wearable device is not only a hardware device, but is used to implement a powerful function through software support, data exchange, and cloud interaction. Generalized wearable intelligent devices include full-featured and large-size devices that can implement complete or partial functions without depending on smartphones, such as smart watches or smart glasses, and devices that focus on only one type of application function and need to work with other devices such as smartphones, such as various smart bands or smart jewelry for monitoring physical signs.

In addition, the terminal device may alternatively be a terminal device in an internet of things (internet of things, IoT) system. IoT is an important part in development of future information technologies. A main technical feature of IoT is to connect an object to a network by using a communication technology, to implement an intelligent network for human-machine interconnection and thing-thing interconnection.

It should be understood that a specific form of the terminal device is not limited in this application.

In the embodiments of this application, a network device may be any device having a wireless transceiver function. The device includes but is not limited to an evolved NodeB (evolved NodeB, eNB), a radio network controller (Radio Network Controller, RNC), a NodeB (NodeB, NB), a base station controller (Base Station Controller, BSC), a base transceiver station (Base Transceiver Station, BTS), a home base station (for example, a home evolved NodeB, or a home NodeB, HNB), a baseband unit (BaseBand Unit, BBU), an access point (Access Point, AP) in a wireless fidelity (Wireless Fidelity, Wi-Fi) system, a wireless relay node, a wireless backhaul node, a transmission point (transmission point, TP), a transmission reception point (transmission reception point, TRP), or the like. Alternatively, the network device may be a gNB or a transmission point (TRP or TP) in a 5G system (for example, an NR system), one antenna panel or a group of antenna panels (including a plurality of antenna panels) of a base station in a 5G system, or a network node, for example, a baseband unit (BBU) or a distributed unit (distributed unit, DU), that constitutes a gNB or a transmission point.

In some deployments, the gNB may include a centralized unit (centralized unit, CU) and a DU. The gNB may further include an active antenna unit (active antenna unit, AAU for short). The CU implements some functions of the gNB, and the DU implements some functions of the gNB. For example, the CU is responsible for processing a non-real-time protocol and a non-real-time service, and implements functions of a radio resource control (radio resource control, RRC) layer and a packet data convergence protocol (packet data convergence protocol, PDCP) layer. The DU is responsible for processing a physical layer protocol and a real-time service, and implements functions of a radio link control (radio link control, RLC) layer, a media access control (media access control, MAC) layer, and a physical (physical, PHY) layer. The AAU implements some physical layer processing functions, radio frequency processing, and a function related to an active antenna. Information at the RRC layer is eventually converted into information at the PHY layer, or is converted from information at the PHY layer. Therefore, in this architecture, higher layer signaling such as RRC layer signaling may also be considered as being sent by the DU or sent by the DU and the AAU. It may be understood that the network device may be a device including one or more of a CU node, a DU node, and an AAU node. In addition, the CU may be classified as a network device in an access network (radio access network, RAN), or may be classified as a network device in a core network (core network, CN). This is not limited in this application.

The network device provides a cell with a service, and the terminal device communicates with the cell by using a transmission resource (for example, a frequency domain resource or a spectrum resource) allocated by the network device. The cell may belong to a macro base station (for example, a macro eNB or a macro gNB), or may belong to a base station corresponding to a small cell (small cell). The small cell herein may include a metro cell (metro cell), a micro cell (micro cell), a pico cell (pico cell), a femto cell (femto cell), and the like. These small cells are characterized by small coverage and low transmit power, and are applicable to providing a high-rate data transmission service.

For ease of understanding of the embodiments of this application, concepts in the embodiments of this application are first described below.

1. Quasi Co-Location (Quasi-Co-Location, QCL) Assumption

The QCL assumption is used to indicate a QCL relationship between two reference signals or a QCL relationship between a reference signal and a channel. A target reference signal may be usually a demodulation reference signal (demodulation reference signal, DMRS) or a channel state information reference signal (channel state information reference signal, CSI-RS), or may be a transmission channel, for example, a physical downlink shared channel PDSCH, a physical downlink control channel PDCCH, a physical uplink shared channel PUSCH, or a physical uplink control channel PUCCH. A referenced reference signal or a source reference signal may be usually a channel state information reference signal (channel state information reference signal, CSI-RS), a tracking reference signal (tracking reference signal, TRS), a synchronization signal/broadcast channel block (synchronous signal/physical broadcast channel block, SSB), or the like. It should be understood that spatial characteristic parameters of two reference signals or channels that satisfy a QCL relationship are the same, so that a spatial characteristic parameter of the target reference signal can be deduced based on a resource index of the source reference signal. The spatial characteristic parameter includes one or more of the following parameters: an angle of arrival (angle of arrival, AoA), a dominant angle of arrival AoA, an average angle of arrival, a power angular spectrum (power angular spectrum, PAS) of the angle of arrival, an angle of departure (angle of departure, AoD), a dominant angle of departure, an average angle of departure, a power angular spectrum of the angle of departure, terminal transmit beamforming, terminal receive beamforming, spatial channel correlation, base station transmit beamforming, base station receive beamforming, an average channel gain, an average channel delay (average delay), a delay spread (delay spread), a Doppler spread (doppler spread), a Doppler shift (doppler shift), a spatial receive parameter (spatial Rx parameter), and the like. These spatial characteristic parameters describe characteristics of a spatial channel between an antenna port of the source reference signal and an antenna port of the target reference signal, and help a terminal device complete receive-side beamforming or a receiving processing process based on the QCL assumption. It should be understood that the terminal may receive the target reference signal based on receive beam information of the source reference signal indicated by using the QCL assumption. To reduce QCL assumption indication overheads of a network device side to a terminal device side, in an optional implementation, the network device side may indicate that a demodulation reference signal of a physical downlink control channel (physical downlink control channel, PDCCH) or a physical downlink shared channel (physical downlink control channel, PDSCH) and one or more of a plurality of reference signal resources previously reported by the terminal device satisfy a QCL relationship. For example, the reference signal may be a channel state information reference signal (channel state information reference signal, CSI-RS). Herein, an index of each reported CSI-RS resource corresponds to one transmit-receive beam pair that is previously established during measurement performed based on the CSI-RS resource. It should be understood that receive beam information of two reference signals or channels that satisfy a QCL relationship is the same, so that the UE may deduce, based on an index of the reference signal resource, receive beam information for receiving the PDCCH or the PDSCH. Four types of QCLs are defined in an existing standard. A base station may configure one or more types of QCLs for the UE, for example, a QCL of a QCL type A and a QCL of a QCL type D, or a QCL of a QCL type C and a QCL of a QCL type D:

type A (type A): a Doppler shift, a Doppler spread, an average delay, and a delay spread;
type B (type B): a Doppler shift and a Doppler spread;
type C (type C): a Doppler shift and an average delay; and
type D (type D): a spatial receive parameter.

Spatial characteristic parameters of two reference signals or channels that satisfy spatial correlation information are the same. Therefore, the spatial characteristic parameter of the target reference signal can be deduced based on the resource index of the source reference signal. A transmission configuration indicator (Transmission configuration indication, TCI) field in DCI is used to indicate a QCL assumption of a DMRS and a corresponding PDSCH.

2. Time Domain Resource Indication of a Physical Downlink Shared Channel PDSCH and a Physical Uplink Shared Channel (Physical Uplink Shared Channel, PUSCH)

A network device indicates, by using signaling, a time domain position of a PDSCH in one time of downlink scheduling, or a time domain position of a PUSCH in one time of uplink scheduling. A common indication mechanism is to indicate an index in the following Table 1 by using a time domain resource allocation field in DCI, and the following three pieces of information corresponding to the index may be determined based on the indicated index:

a slot offset K0 between a slot in which the scheduled PDSCH or PUSCH is located and a slot in which a PDCCH carrying the DCI is located, a start OFDM symbol S of the PDSCH or the PUSCH in the slot in which the PDSCH or the PUSCH is located, and a quantity L of OFDM symbols included in the PDSCH or the PUSCH in the slot in which the PDSCH or the PUSCH is located.

TABLE 1

| Index | Slot offset K0 | Start symbol S | Quantity L of symbols |
|---|---|---|---|
| 1 | 0 | 2 | 12 |
| 2 | 0 | 3 | 5 |
| ... | ... | ... | ... |
| 16 | 1 | 8 | 4 |

For example, if it indicates that four bits of a time domain resource allocation field in a piece of DCI is 1111, corresponding information in row 16 of the table is correspondingly used. In this case, it may be determined that a PDSCH or PUSCH scheduled in this time is in a next slot of a slot in which the DCI is located, and includes four consecutive OFDM symbols whose start OFDM symbol is a symbol 8.

3. Repeated Transmission

Repeated transmission means that a network device allocates, in one time of scheduling, a plurality of resources to a terminal device to send a same TB. In a manner, the network device indicates, by using a time domain resource allocation field in DCI, a symbol resource used for the first repeated transmission, and indicates, by using another piece of signaling, a quantity m of repeated transmissions. In addition, a time domain position relationship between symbol resources used for a plurality of repeated transmissions is specified in a protocol or preset by a system. Therefore, the terminal device can determine time domain positions of the plurality of resources used to repeatedly transmit the TB.

Different from a hybrid automatic repeat request (hybrid automatic repeat request, HARQ) mechanism in which after an error occurs when a TB is transmitted by using a resource allocated in the first time of scheduling, the network device schedules another resource used to send the TB, to transmit the TB, a repeated transmission mechanism means that the network device allocates, when a TB is transmitted for the first time, a plurality of resources used to send the TB, instead of allocating another resource used to send the TB again after the first transmission fails. In a transmission manner, the network device delivers one piece of DCI signaling to schedule a plurality of resources that carry a same TB, data carried on the plurality of resources corresponds to a same HARQ-ACK feedback bit, and the data carried on the plurality of resources corresponds to a same HARQ process, a same HARQ process entity, or a same HARQ process number.

Figure 2:
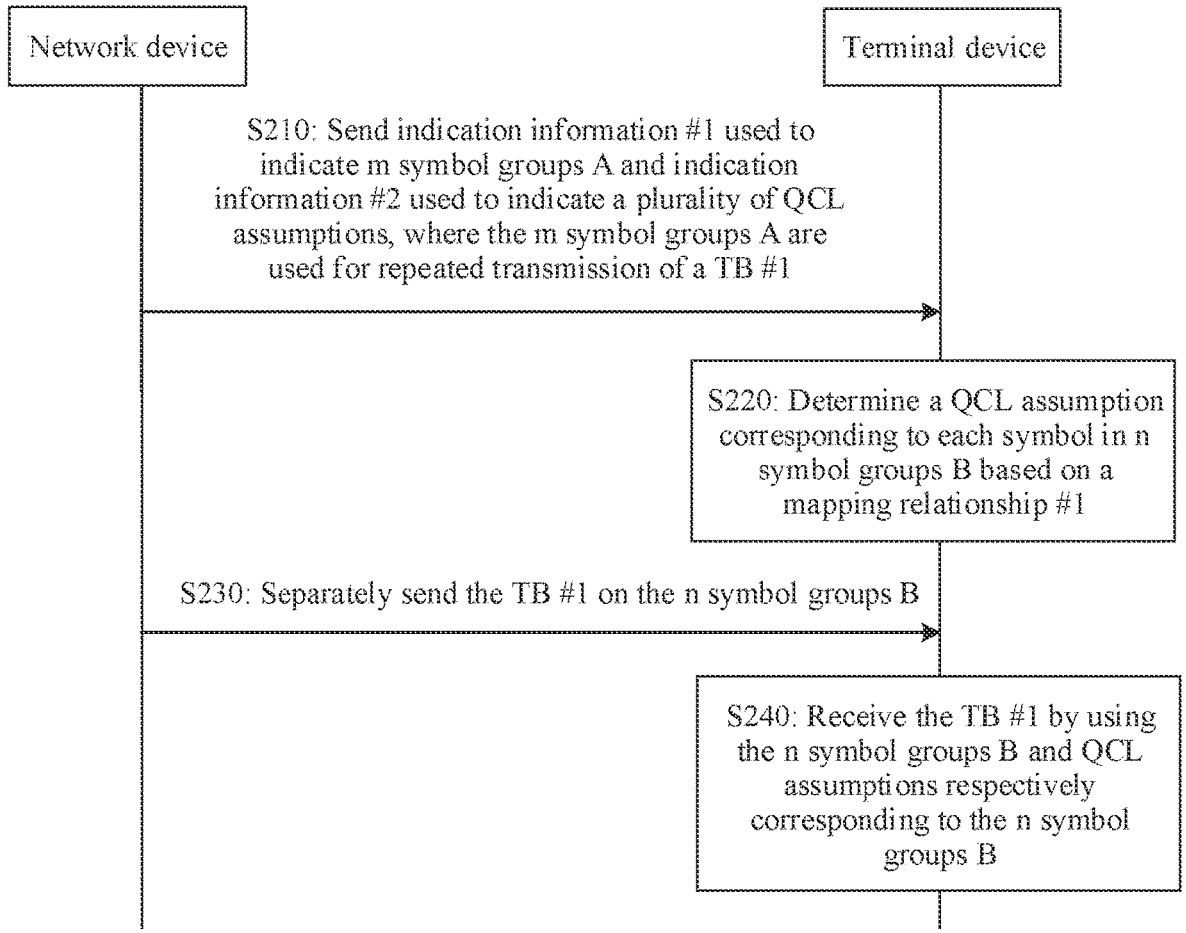
FIG. 2 is a schematic flowchart of a wireless communication method according to this application.

FIG. 2 is an example flowchart of a wireless communication method according to an embodiment of this application.

As described in FIG. 2, in S210, a network device sends indication information #1 (that is, an example of first indication information) to a terminal device, where the indication information #1 is used to indicate m symbol groups A (that is, an example of first symbol groups, where the m symbol groups A are denoted as a symbol group A1, a symbol group A2, ..., and a symbol group Am below for ease of understanding and differentiation).

The m symbol groups indicated by the indication information #1 are used for repeated transmission of a same TB (that is, an example of a first TB, where the TB is denoted as a TB #1 below for ease of understanding and differentiation).

In this application, each of the m symbol groups A includes at least one symbol, the m symbol groups A include K symbols in total, and m is an integer greater than or equal to 2.

By way of example, and not limitation, in this application, the indication information #1 may include any one of the following formats:

Format 1

The indication information #1 directly indicates time domain positions of the m symbol groups A. For example, the indication information #1 includes m time domain resource allocation fields, and each field indicates a start OFDM symbol and a quantity of OFDM symbols included in one of the m symbol groups A. The terminal device determines, based on a quantity m of retransmissions that is indicated by the network device, a time domain resource indication field included in the indication information #1, to determine a length of the indication information #1.

Format 2

Figure 3:
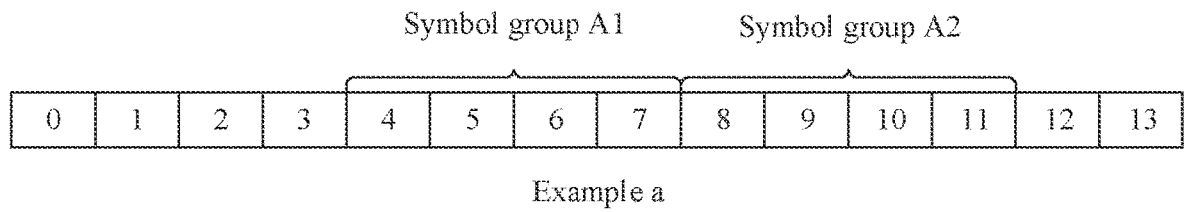
FIG. 3 is a schematic diagram of an example of m symbol groups A according to this application.
Figure 3:
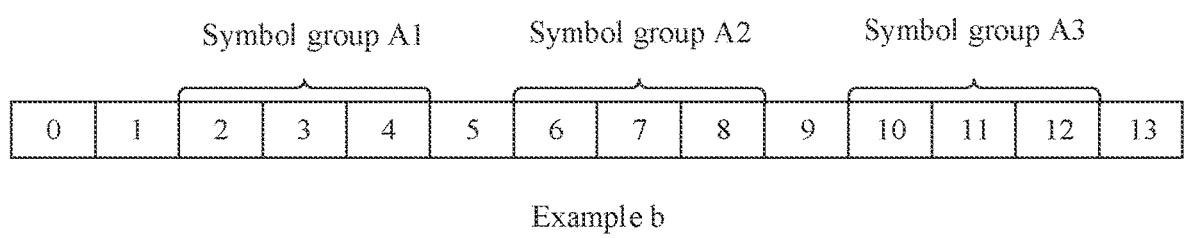

The indication information #1 indicates only a start symbol of the $1^{st}$ symbol group A in the m symbol groups A and a quantity of symbols included in each symbol group A. The terminal device determines a time domain position of each of the m symbol groups A based on a time domain position of the $1^{st}$ symbol group A, a quantity of repetitions, and a symbol interval between two adjacent symbol groups A. The interval between two adjacent symbol groups A is a preset quantity of symbols. For example, the preset quantity is 0, that is, there is no symbol interval between two adjacent symbol groups A. A time domain resource indication field in the indication information #1 indicates that the start symbol of the $1^{st}$ symbol group A is a symbol 2, and each symbol group A includes four symbols. In addition, the quantity m of repetitions that is indicated by the network device is 2, that is, there are two symbol groups A. In this case, it may be determined that, in the two symbol groups A, the $1^{st}$ symbol group A includes symbols 4, 5, 6, and 7, and the $2^{nd}$ symbol group A includes symbols 8, 9, 10, and 11, as shown in an example a in FIG. 3. For another example, the preset quantity is 1, that is, two adjacent symbol groups A are separated by one symbol. The resource indication field in the indication information #1 indicates that the start symbol of the $1^{st}$ symbol group A is 2, and each symbol group A includes three symbols. In addition, the quantity m of repetitions that is indicated by the network device is 3, that is, there are three symbol groups A. In this case, it may be determined that, in the three symbol groups A, a symbol group A1 includes symbols 2, 3, and 4 and is followed by an interval of a symbol 5, a symbol group A2 includes symbols 6, 7, and 8 and is followed by an interval of a symbol 9, and a symbol group A3 includes symbols 10, 11, and 12, as shown in an example b in FIG. 3. In the foregoing examples, that the indication information #1 indicates the $1^{st}$ symbol group A in the m symbol groups A is used as an example for description. However, this application is not limited thereto. The indication information #1 may further indicate the last symbol group A in the m symbol groups A, or a time-frequency position of one preset symbol group A in the m symbol groups A.

In this application, the quantity m of repetitions for sending the TB #1 may be indicated by a reserved field in DCI that carries the indication information #1, may be indicated by DCI other than the DCI that carries the indication information #1, or may be indicated by a radio resource control (radio resource control, RRC) message.

In S220, the terminal device determines a QCL assumption corresponding to each of n symbol groups B (that is, an example of second symbol groups, where the n symbol groups B are denoted as a symbol group B1, a symbol group B2, ..., and a symbol group Bn below for ease of understanding and differentiation) based on a mapping relationship #1 (that is, an example of a first mapping relationship), where the n symbol groups B include L symbols in the K symbols in the m symbol groups A.

Optionally, in S220, the terminal device directly determines the QCL assumption corresponding to each of the n symbol groups B.

When symbols of two slots are used for one transmission of repeated transmission because a slot boundary is crossed, the network device and the terminal device need to reach a consensus on the quantity of repeated transmissions (that is, a case 1). In addition, an NR system supports flexible conversion between uplink transmission and downlink transmission and a plurality of services that have different delay requirements. In this case, symbol usage priorities are different. Consequently, a symbol in the m symbol groups A is occupied by another signal and cannot be used to send the TB #1 (that is, a case 2). In the foregoing two cases, the n symbol groups B actually used to send the TB #1 in repeated transmission are inconsistent with the m symbol groups A indicated by the indication information #1. In the foregoing two cases, the network device and the terminal device first need to reach a consensus on a symbol group resource used for repeated transmission, and then determine a QCL assumption used for each repetition.

The following first describes in detail the step of determining the n symbol groups B in the foregoing two cases, and then describes in detail the step of determining the QCL assumption corresponding to each of the n symbol groups B.

Case 1: At least one of the m symbol groups A includes symbols in two slots.

In this application, when the m symbol groups A include at least one cross-slot symbol group A, and the cross-slot symbol group A includes symbols belonging to different slots: a symbol in a slot #1 (that is, an example of a first symbol) and a symbol in a slot #2 (that is, an example of a second symbol), the symbol group A is divided into two symbol groups B in the n symbol groups B by a slot boundary, that is, the symbol in the slot #1 and the symbol in the slot #2 respectively form different symbol groups B in the n symbol groups B. In addition, the n symbol groups B further include a symbol group A in the m symbol groups A that includes only a symbol belonging to one slot. In other words, each symbol group A in the m symbol groups A that includes symbols belonging to different slots corresponds to one symbol group pair in the n symbol groups B, and one symbol group pair includes two symbol groups B. The symbol in the slot #1 and the symbol in the slot #2 respectively form two symbol groups B included in one symbol group pair. The n symbol groups B further include a symbol group A, in the m symbol groups A, other than the symbol group A that includes the symbols belonging to different slots. In other words, in addition to the symbol group pair, the n symbol groups B further include a symbol group A in the m symbol groups A that includes only a symbol belonging to one slot.

Figure 4:
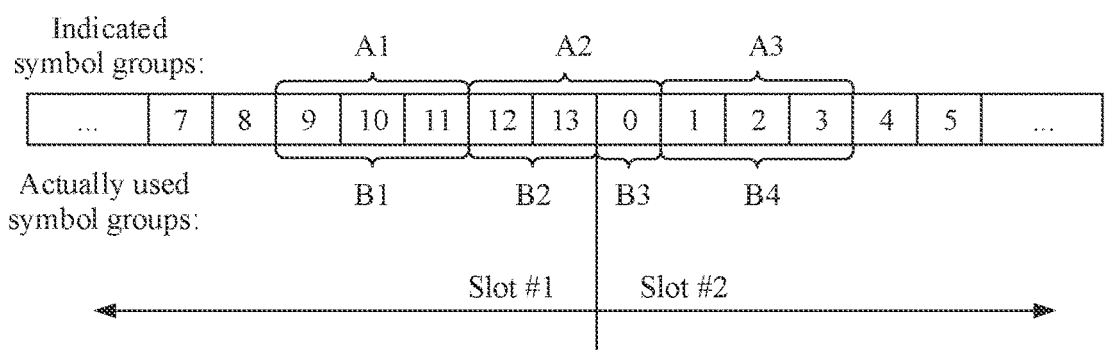
FIG. 4 is a schematic diagram of an example of determining n symbol groups B according to this application.

For example, the indication information #1 indicates three symbol groups A used to send the TB #1. As shown in FIG. 4, a symbol group A2 includes symbols in two slots across a slot boundary: symbols 12 and 13 in a slot #1, and a symbol 0 in a slot #2. In this case, the symbol group A2 is divided into two symbol groups B by the slot boundary, where a symbol group B2 includes the symbols 12 and 13 in the slot #1, and a symbol group B3 includes the symbol 0 in the slot #2. A symbol group A1 and a symbol group A3, in the three symbol groups A, that each include only symbols belonging to one slot become a symbol group B1 and a symbol group B4. Therefore, four symbol groups B are determined.

Case 2: The TB #1 is carried on a signal #1 (that is, an example of a first signal), and the m symbol groups A include a symbol used to carry a signal #2 (that is, an example of a second signal).

In this application, the n symbol groups B do not include a symbol group A in the m symbol groups A that includes the symbol used to carry the signal #2, and the n symbol groups B include a symbol group A, in the m symbol groups A, other than the symbol group A that includes the symbol used to carry the signal #2. In other words, when the m symbol groups A include the symbol used to carry the second signal, the symbol group A that includes the symbol used to carry the signal #2 is discarded, and is not used to send the TB #1. That is, the n symbol groups B used to send the TB #1 include a symbol group A other than the discarded symbol group A in the m symbol groups A. The signal #2 is a signal with a symbol usage priority higher than that of the signal #1. It should be noted that the symbol used to carry the signal #2 may be one or more symbols that are determined by the terminal device in a manner as symbols reserved for transmitting the signal #2 and that cannot be used to send the TB #1, but whether the one or more symbols actually carry the signal #2 is not limited herein in this application. It may also be understood that the symbol used to carry the signal #2 is a symbol that cannot be used to send the TB #1, and therefore the symbol group A including the symbol used to carry the signal #2 is discarded.

By way of example, and not limitation, this application further includes: The terminal device receives indication information #3 (that is, an example of third indication information) sent by the network device. The indication information #3 is used to indicate a discarded symbol in the m symbol groups A, and the n symbol groups B do not include a symbol group A, in the m symbol groups A, in which the discarded symbol is located. Alternatively, the indication information #3 is used to indicate a discarded symbol group in the m symbol groups A, and the n symbol groups B do not include the discarded symbol group in the m symbol groups A.

By way of example, and not limitation, the symbol used to carry the signal #2 may be any one of the following symbols.

a. Symbol Having a Transmission Direction Different from that of a Symbol for Transmitting the Signal #1

For example, when the signal #1 is a downlink signal, and the symbol used to carry the signal #2 is an uplink symbol, that is, the signal #2 is an uplink signal, or in other words, when the m symbol groups A indicated by the indication information #1 are used to send a downlink TB (that is, the TB #1 is a downlink TB), but the m symbol groups A include an uplink symbol used to transmit an uplink signal, a symbol group A in the m symbol groups A that includes the uplink symbol is discarded and is not used to send the TB #1, and a symbol group A that does not include the uplink symbol is used as the n symbol groups and is used to send the TB #1. This solution is also applicable to a case in which the signal #1 is an uplink signal, and the symbol used to carry the signal #2 is a downlink symbol, that is, the signal #2 is a downlink signal.

Figure 5:
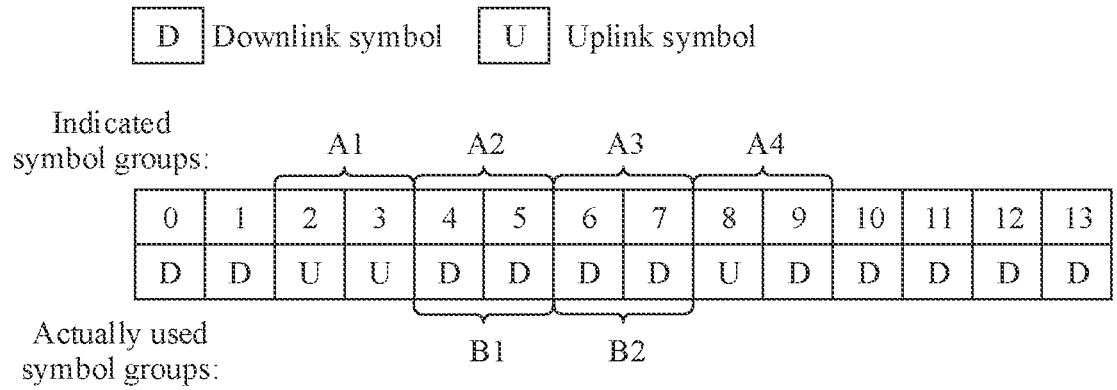
FIG. 5 is a schematic diagram of another example of determining n symbol groups B according to this application.

For example, in FIG. 5, downlink transmission is used as an example. The indication information #1 indicates four symbol groups A used to send the downlink TB #1, each symbol group A includes two symbols, and the four symbol groups A include eight symbols in total (that is, K=8). A symbol group A1 includes symbols 2 and 3, a symbol group A2 includes symbols 4 and 5, a symbol group A3 includes symbols 6 and 7, and a symbol group A4 includes symbols 8 and 9. However, because symbols 2, 3, and 8 are uplink symbols used to carry an uplink signal, and cannot be used to send a downlink signal, the symbol group A1 including the symbols 2 and 3 and the symbol group A4 including the symbol 8 are discarded and are not used to send the TB #1. In this case, symbol groups A other than the symbol group A1 and the symbol group A4 in the four symbol groups A, that is, the symbol group A2 and the symbol group A3, are used as a symbol group B1 and a symbol group B2 in two symbol groups B and are used to send the TB #1. The two symbol groups B include L=4 symbols in the K=8 symbols in the four symbol groups A, that is, symbols 2, 3, 8, and 9. The terminal device may determine, by using the indication information #3, that the symbols 2, 3, and 8 are uplink symbols used to carry an uplink signal. The indication information #3 may be downlink control information, for example, common control information used to indicate a slot format, may be broadcast information, or may be an RRC message. This is not limited in this application.

b. Symbol for Carrying a Signal Having a Priority Higher than that of the Signal #1

For example, the signal #2 may be an SSB, or may be a reference signal, for example, a CSI-RS or a TRS. The signal #2 may alternatively be DCI, or the symbol used to carry the signal #2 is at least one of a symbol on which a PDCCH is located, a symbol on which a control resource set (control resource set, CORESET) is located, or a symbol on which a PDCCH search space is located. The signal #2 may alternatively be a TB with a symbol usage priority higher than that of the signal #1. For example, the signal #2 is a TB of a URLLC service, and the signal #1 is a TB of an eMBB service. Alternatively, the signal #1 and the signal #2 may be TBs of a same service but have different symbol usage priorities, or terminal devices to which the signal #1 and the signal #2 belong have different symbol usage priorities. In this solution, priorities of the signal #1 and the signal #2 may be specified in a protocol or preset by a system, or may be indicated by the network device. For example, a priority of a signal scheduled by using DCI is determined based on a radio network temporary identifier (radio network temporary identify, RNTI) of the DCI used for scheduling. However, this application is not limited thereto.

It should be noted that the solutions corresponding to the foregoing two cases may be implemented separately, or may be implemented in combination with each other. For example, after a symbol group B and a quantity of symbol groups B are first determined for the case 1, a symbol group B actually used to send the TB #1 and a quantity of symbol groups B actually used to send the TB #1 are further determined for the case 2. Alternatively, after a symbol group B and a quantity of symbol groups B are first determined for the case 2, a symbol group B actually used to send the TB #1 and a quantity of symbol groups B actually used to send the TB #1 are further determined for the case 2.

The network device and the terminal device determine, in the foregoing manner, the n symbol groups B actually used to send the TB #1. When the m symbol groups A indicated by the network device include a symbol used to carry a signal other than the TB #1, or the m symbol groups A include a symbol group A that includes symbols belonging to different slots, and the symbol group actually used to send the TB #1 is inconsistent with the symbol group indicated by the network device, the network device and the terminal device can reach a consensus on the n symbol groups B actually used to send the TB #1, and therefore can correctly receive and send the TB #1 carried on the n symbol groups B.

It should be noted that, when there are R interval symbols (denoted as interval symbols A) between two adjacent symbol groups A in the m symbol groups A, in this application, there may be E interval symbols (denoted as interval symbols B) between two adjacent symbol groups B in the n symbol groups B. In addition, values of E and R may be the same or different. This is not specifically limited in this application.

For example, as shown in FIG. 4, there is no symbol interval between two adjacent symbol groups in the three symbol groups A, that is, E=0. In this case, there is also no symbol interval between the n symbol groups, that is, R=0. In this example, the values of E and R are the same.

Figure 6:
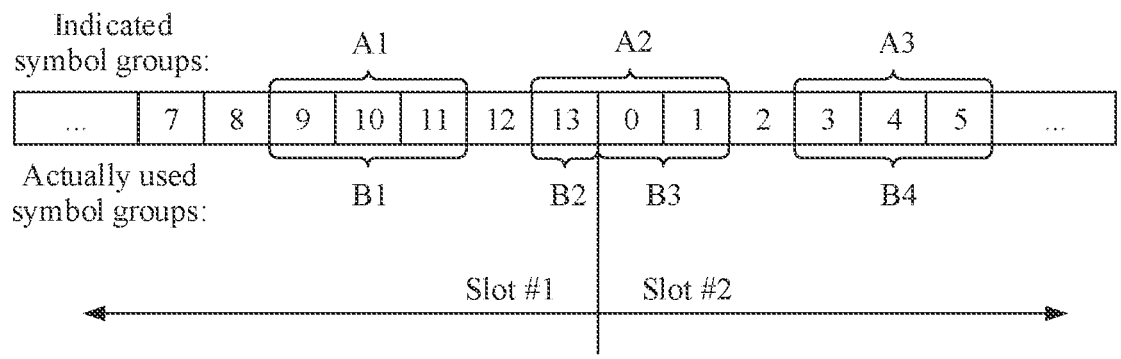
FIG. 6 is a schematic diagram of an example of determining a symbol interval between n symbol groups B according to this application.

For another example, the indication information #1 indicates three symbol groups A used to send the TB #1. As shown in FIG. 6, a symbol group A2 includes symbols in two slots across a slot boundary: a symbol 13 in a slot #1, and symbols 0 and 1 in a slot #2. In this case, the symbol group A2 is divided into two symbol groups B by the slot boundary, where a symbol group B2 includes the symbol 13 in the slot #1, and a symbol group B3 includes the symbols 0 and 1 in the slot #2. A symbol group A1 and a symbol group A3, in the three symbol groups A, that each include only symbols belonging to one slot become a symbol group B1 and a symbol group B4. Therefore, four symbol groups B are determined. Two adjacent symbol groups in the three symbol groups A are separated by one symbol, that is, E=1. To be specific, the symbol group A1 and the symbol group A2 are separated by a symbol 12 in the slot #1, and the symbol group A2 and the symbol group A3 are separated by a symbol 2 in the slot #2. In this case, the two symbol intervals still exist between the symbol groups B. The symbol group B1 and the symbol group B2 are separated by the symbol 12 in the slot #1 and the symbol group B3 and the symbol group B4 are separated by the symbol 2 in the slot #2, but there is no symbol interval between the symbol group B2 and the symbol group B3 because the symbol group B2 and the symbol group B3 are obtained through division of the symbol group A2 by the slot boundary, that is, R=1 or R=0. The values of E and R are different.

Figure 7:
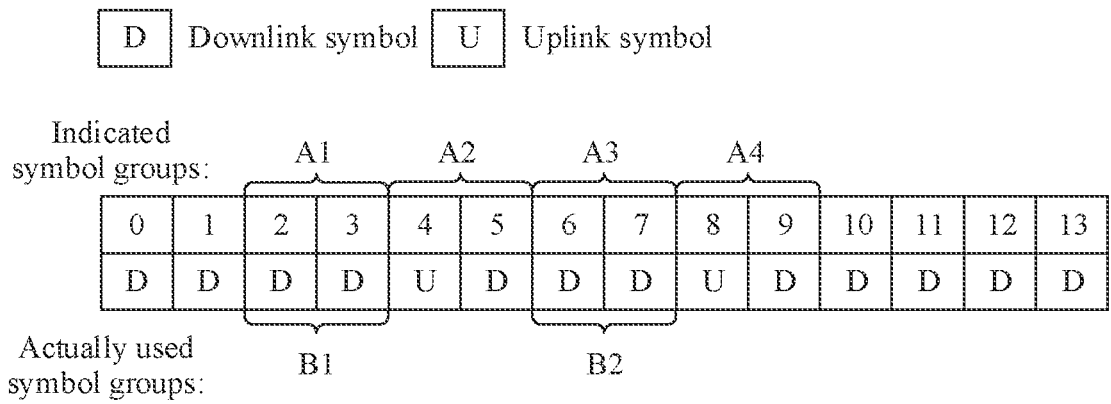
FIG. 7 is a schematic diagram of another example of determining a symbol interval between n symbol groups B according to this application.

For another example, as shown in FIG. 7, there is no symbol interval between four symbol groups A, that is, E=0. However, because symbol groups A2 and A4 respectively include uplink symbols 4 and 8 used for uplink transmission, the symbol groups A2 and A4 are discarded and are not used to send the TB #1. Therefore, a symbol group A1 and a symbol group A4 are used as a symbol group B1 and a symbol group B2 to form two symbol groups B. The two symbol groups B are separated by two symbols: symbols 4 and 5, that is, R=2. In this case, the values of E and R are different.

That the terminal device determines the QCL assumption corresponding to each of the n symbol groups B based on the indication information #1 and the mapping relationship #1 in this application is described in detail below.

S220 further includes: The terminal device receives indication information #2 (that is, an example of second indication information) that is sent by the network device and used to indicate P QCL assumptions, where the mapping relationship #1 is a correspondence between the n symbol groups B and the P QCL assumptions.

By way of example, and not limitation, the P QCL assumptions are sequentially and cyclically mapped to the n symbol groups B.

By way of example, and not limitation, the mapping relationship #1 is used to indicate a one-to-one correspondence between the n symbol groups B and n QCL assumptions, where the n QCL assumptions are generated by cyclically and repeatedly arranging, in a preset sequence, the P QCL assumptions indicated by the indication information #2.

By way of example, and not limitation, in this application, the indication information #2 may include any one of the following formats:

Format 1

The network device may configure at least one QCL assumption for the terminal device by using an RRC message. The indication information #2 may indicate P QCL assumptions in the at least one QCL assumption configured by the network device for the terminal device, the indication information #2 may include indexes of the P QCL assumptions, or the indication information #2 may indicate an index of one QCL assumption and a value of P. The terminal device obtains the P QCL assumptions in ascending or descending order of the index of the indicated QCL assumption.

Format 2

After configuring at least one QCL assumption for the terminal device by using an RRC message, the network device further configures one or more QCL assumption combinations. The indication information #2 indicates an index of one combination. The terminal device determines the P QCL assumptions based on the index. For example, as shown in Table 2, the network device configures eight QCL assumption combinations for the terminal device. Each combination includes one or more QCL assumptions. If the indication information #2 indicates 001, the indication information #2 indicates three QCL assumptions (that is, P=3) in a QCL assumption combination 1: a QCL assumption 1, a QCL assumption 5, and a QCL assumption 6. In this case, the three QCL assumptions are to be used to send the TB #1.

TABLE 2

| Index of a QCL assumption combination | QCL assumption combination |
| --- | --- |
| 0 | QCL assumption 0 and QCL assumption 2 |
| 1 | QCL assumption 1, QCL assumption 5, and QCL assumption 6 |
| . . . | . . . |
| 7 | QCL assumption 8 |

The indication information #2 may be a configuration parameter in the RRC message, a reserved field in the downlink control information that carries the first indication information, or a reserved field in another piece of downlink control information that is different from the downlink control information that carries the first indication information.

The following describes in detail a method for generating the n QCL assumptions by cyclically and repeatedly arranging, in the preset sequence, the P QCL assumptions indicated by the indication information #2.

The preset sequence may be a sequence of the P QCL assumptions indicated by the indication information #2, and QCL assumptions corresponding to the n symbol groups B are obtained by sequentially and cyclically arranging the P QCL assumptions.

For example, if n=P, the QCL assumptions corresponding to the n symbol groups B are in a one-to-one correspondence with the P QCLs indicated by the indication information #2.

Figure 8:
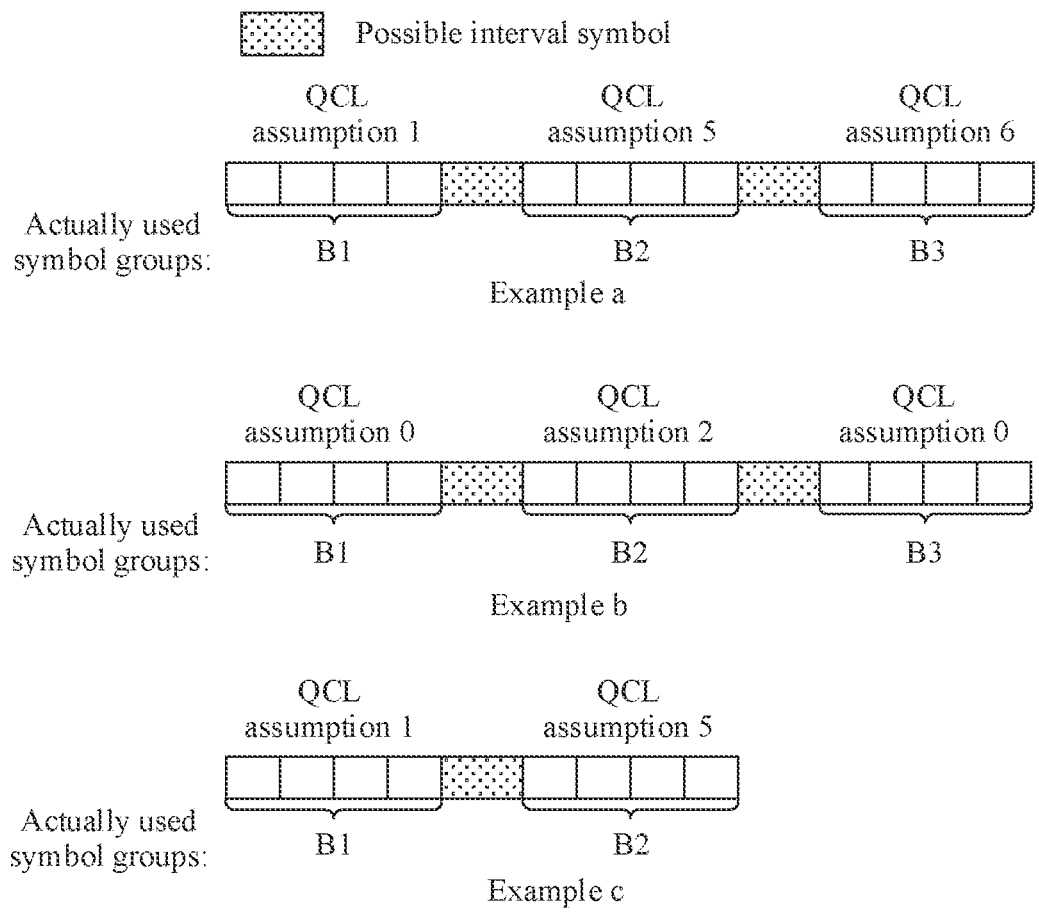
FIG. 8 is a schematic diagram of an example of a QCL assumption corresponding to each of n symbol groups B according to this application.

For example, as shown in an example a in FIG. 8, resources actually used to send the TB #1 are three symbol groups B, and the indication information #2 sent by the network device indicates, by using the foregoing format 2, the three QCL assumptions (that is, P=3) in the QCL assumption combination 1 in Table 2. In this case, the three symbol groups B are sequentially in a one-to-one correspondence with the three QCL assumptions. To be specific, a symbol group B1 corresponds to the QCL assumption 1, a symbol group B2 corresponds to the QCL assumption 5, and a symbol group B3 corresponds to the QCL assumption 6. The TB #1 is sent once by using each of the three symbol groups B and a QCL assumption corresponding to each of the three symbol groups B, and the TB #1 is sent for three times in total.

For example, if n>P, the n symbol groups B sequentially and cyclically correspond to the P QCL assumptions indicated by the indication information #2.

For example, as shown in an example b in FIG. 8, resources used to send the TB #1 are three symbol groups B, and the indication information #2 sent by the network device indicates, by using the foregoing format 2, two QCL assumptions (P=2) in the QCL assumption combination 0 in Table 2. In this case, the three symbol groups B sequentially and cyclically correspond to the two QCL assumptions. To be specific, a symbol group B1 corresponds to the QCL assumption 0, a symbol group B2 corresponds to the QCL assumption 2, and for a QCL assumption corresponding to a symbol group B3, the $1^{st}$ QCL assumption in the QCL assumption combination is looped to, that is, the QCL assumption 0 is looped to.

In this solution, when the QCL assumptions in the QCL assumption combination are correspondingly exhausted, the $1^{st}$ QCL assumption in the QCL assumption combination is looped to, and mapping continues to be sequentially performed.

Alternatively, the terminal device generates, based on the two QCL assumptions in the QCL assumption combination 0 indicated by the indication information #2, three QCL assumptions that are in a one-to-one correspondence with the three symbol groups B. The three QCL assumptions may be obtained by sequentially and cyclically arranging the two QCL assumptions in the QCL assumption combination 0. To be specific, the three QCL assumptions are the QCL assumption 0, the QCL assumption 2, and the QCL assumption 0, and are in a one-to-one correspondence with the three symbol groups B: the symbol group B1, the symbol group B2, and the symbol group B3.

For example, if n<P, the n QCL assumptions are sequentially in a one-to-one correspondence with the first n QCL assumptions in the P QCL assumptions indicated by the indication information #2.

For example, as shown in an example c in FIG. 8, resources used to send the TB #1 are two symbol groups #2, and the indication information #2 sent by the network device indicates, by using the foregoing format 2, the three QCL assumptions (P=3) in the QCL assumption combination 1 in Table 2. In this case, the two symbol groups B are in a one-to-one correspondence with the first two QCL assumptions in the QCL assumption combination. To be specific, a symbol group B1 corresponds to the QCL assumption 1, and a symbol group B2 corresponds to the QCL assumption 2.

In addition, the preset sequence may alternatively be a sequence in which the indicated QCL assumptions are arranged in ascending order of the indexes of the QCL assumptions, or a sequence in which the indicated QCL assumptions are arranged in descending order of the indexes of the QCL assumptions. This application is not limited thereto.

It should be understood that the listed mapping relationship between the n symbol groups B and the P QCLs is merely an example for description, but this application is not limited thereto, provided that it is ensured that mapping relationships determined by the network device and the terminal are consistent. For example, the mapping relationship may be sequential and cyclic mapping mentioned in the following mapping mode A, or may be centralized mapping mentioned in the following mapping mode B. To avoid repetition, detailed descriptions thereof are omitted herein.

Mapping mode A: The P QCL assumptions are sequentially and cyclically mapped to the n second symbol groups.

For example, the terminal device receives the first indication information indicating the m=8 first symbol groups, where first symbol groups #1 to #8 in the m=8 first symbol groups sequentially occupy eight time units #1 to #8 in time domain, and the terminal device determines that time domain resources actually occupied for transmission are the n second symbol groups #1 to #4 that sequentially occupy two time units in time domain and respectively correspond to four time units #1, #3, #5, and #7 occupied by the m first symbol groups. The terminal device receives the second indication information and determines two QCL assumptions {QCL assumption 1, QCL assumption 2}. Further, the terminal device determines that the first mapping relationship is that the second symbol groups #1 to #4 sequentially correspond to the QCL assumption 1, the QCL assumption 2, the QCL assumption 1, and the QCL assumption 2, or correspond to the QCL assumption 2, the QCL assumption 1, the QCL assumption 2, and the QCL assumption 1.

Sequential and cyclic mapping means: When a quantity P of QCL assumptions is equal to a quantity of second symbol groups, each second symbol group corresponds to one different QCL assumption. When a quantity P of QCL assumptions is less than a quantity of second symbol groups, the first P second symbol groups respectively correspond to the P QCL assumptions, where for example, a second symbol group k corresponds to a QCL assumption k, and k∈{1, . . . , P}; and P second symbol groups starting from a (P+1)$^{th}$ second symbol group sequentially correspond to the P QCL assumptions, where for example, a second symbol group P+k corresponds to the QCL assumption k, and a second symbol group 2P+k corresponds to the QCL assumption k.

Mapping mode B: The P QCL assumptions are mapped to the n second symbol groups in a centralized manner.

For example, the terminal device receives the first indication information indicating the m=8 first symbol groups, where first symbol groups #1 to #8 in the m=8 first symbol groups sequentially occupy eight time units #1 to #8 in time domain, and the terminal device determines that time domain resources actually occupied for transmission are the n second symbol groups #1 to #4 that sequentially occupy two time units in time domain and respectively correspond to four time units #1, #3, #5, and #7 occupied by the m first symbol groups. The terminal device receives the second indication information and determines two QCL assumptions {QCL assumption 1, QCL assumption 2}. Further, the terminal device determines that the first mapping relationship is that the second symbol groups #1 to #4 sequentially correspond to the QCL assumption 1, the QCL assumption 1, the QCL assumption 2, and the QCL assumption 2, or correspond to the QCL assumption 2, the QCL assumption 2, the QCL assumption 1, and the QCL assumption 1.

Centralized mapping means: When a quantity P of QCL assumptions is equal to a quantity of second symbol groups, each second symbol group corresponds to one different QCL assumption. When a quantity P of QCL assumptions is less than a quantity of second symbol groups, the second symbol groups are classified into P parts, and each part corresponds to one different QCL assumption. When the quantity K of second symbol groups is an integer multiple of the quantity P of QCL assumptions, each part includes K/P second symbol groups. When the quantity K of second symbol groups is not an integer multiple of the quantity P of QCL assumptions, the first $$\left\lceil \frac{K}{P} \right\rceil - 1$$

parts each include K/P second symbol groups, a $$\left\lceil \frac{K}{P} \right\rceil^{th}$$

includes $$K - \left(\left\lceil \frac{K}{P} \right\rceil - 1\right) \times P$$

second symbol groups, and all second symbol groups in a k$^{th}$ second symbol group correspond to a QCL assumption k, where k∈{1, . . . , P}.

S230: The network device separately sends the TB #1 on the n symbol groups B.

S240: The terminal device receives n repeatedly transmitted TBs #1 by using the n symbol groups B and the QCL assumptions respectively corresponding to the n symbol groups B.

In this application, when the TB #1 is sent on the n symbol groups B, each symbol group B carries a demodulation reference signal (demodulation reference resource, DMRS) used to demodulate data. In this way, each symbol group B actually used for sending includes a DMRS. Even if the TB #1 gets through different channel environments because different QCL assumptions are used when the TB #1 is sent on the symbol groups B, channel information can be accurately obtained.

When the n symbol groups B actually used for repeated transmission are inconsistent with the m symbol groups A indicated by the network device, and consequently the corresponding QCL assumptions are unclear, the foregoing solutions can be used to enable the network device and the terminal device to reach a consensus on the QCL assumptions corresponding to the n actually used symbols, to correctly send and receive data. In addition, transmission robustness is further increased in a manner in which the TB #1 is sent by cyclically using different QCL assumptions.

Figure 9:
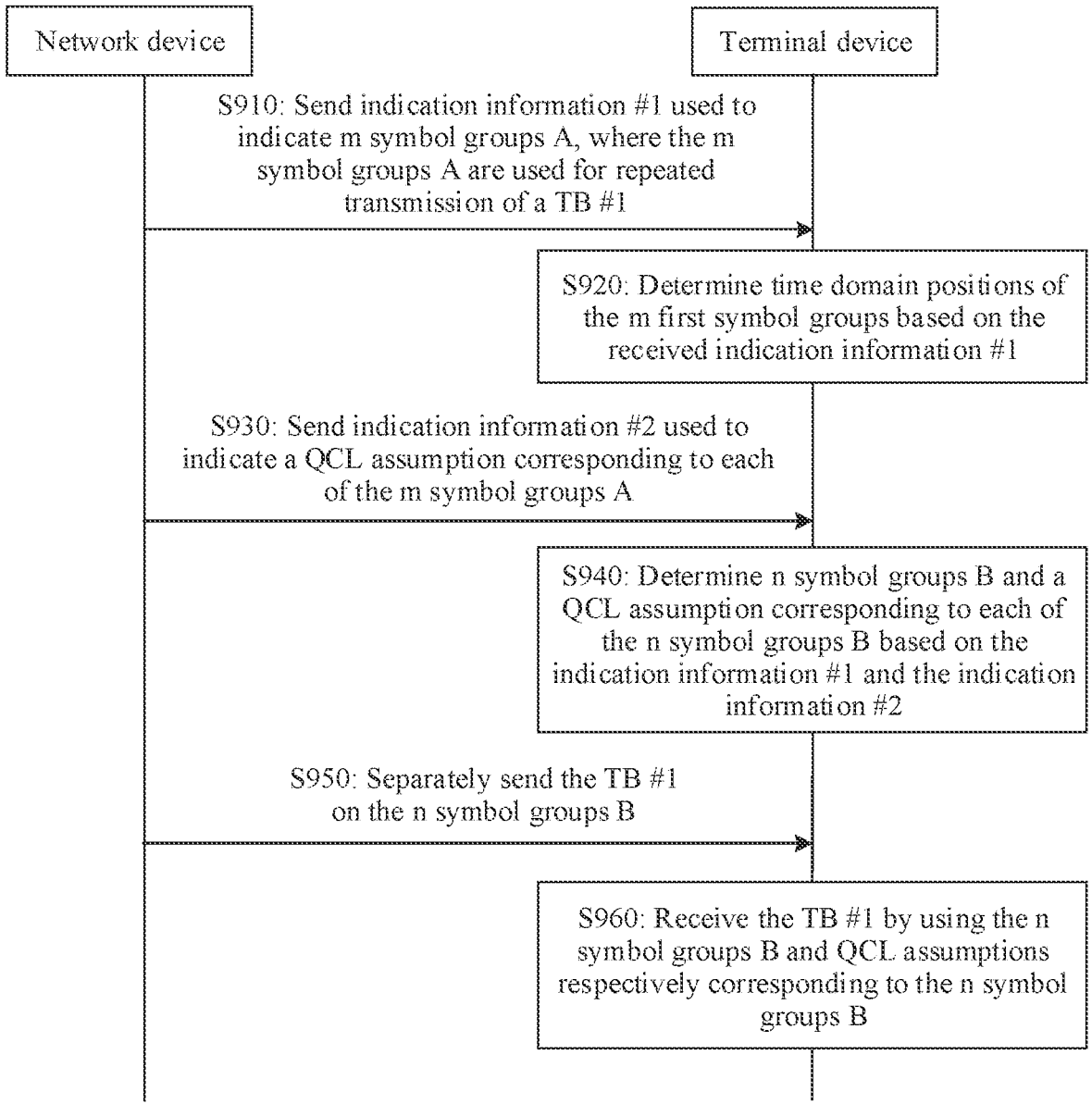
FIG. 9 is a schematic flowchart of an example of a wireless communication method according to this application.

FIG. 9 is another example flowchart of a wireless communication method according to an embodiment of this application.

S910 shown in FIG. 9: A network device sends, to a terminal device, indication information #1 (that is, an example of first indication information) used to indicate m symbol groups A (that is, an example of first symbol groups).

The m symbol groups A are used for repeated transmission of a same TB (that is, an example of a first TB, where the TB is denoted as a TB #1 below for ease of understanding and differentiation).

S920: The terminal device determines time domain positions of the m symbol groups A based on the received indication information #1.

After receiving the indication information #1, the terminal device may determine the m symbol groups A according to the method for determining the m symbol groups A in the example in the embodiment shown in FIG. 2 of this application. Details are not described herein again.

In S930, the network device sends, to the terminal device, indication information #2 used to indicate a QCL assumption corresponding to each of the m symbol groups A.

The indication information #2 sent by the network device indicates P QCL assumptions, and the P QCL assumptions have a correspondence with the m symbol groups A. In this solution, the terminal device may determine, based on a quantity of the QCL assumptions indicated by the indication information #2, a quantity m of repetitions of repeatedly transmitting the TB #1. However, this application is not limited thereto. The quantity m of repetitions may alternatively be indicated by a reserved field in downlink control information that carries the first indication information, or indicated by a piece of configuration information in an RRC message. The indication information #2 may be a configuration parameter in the RRC message, a reserved field in the downlink control information that carries the indication information #1, or a reserved field in another piece of downlink control information that is different from the downlink control information that carries the indication information #1.

It should be understood that a specific form of a mapping relationship between the m symbol groups A and the P QCL assumptions is not limited in this application, provided that it is ensured that mapping relationships determined by the network device and the terminal are consistent. For example, the mapping relationship may be sequential and cyclic mapping mentioned in the following mapping mode C, or may be centralized mapping mentioned in the following mapping relationship D. In addition, the mapping relationship between the m symbol groups A and the P QCL assumptions may alternatively be similar to that in a current technology. To avoid repetition, detailed descriptions thereof are omitted herein.

Mapping mode C: The P QCL assumptions are sequentially and cyclically mapped to the m first symbol groups.

For example, the terminal device receives the first indication information indicating the m=8 first symbol groups, where first symbol groups #1 to #8 in the m=8 first symbol groups sequentially occupy eight time units #1 to #8 in time domain. The terminal device receives second indication information and determines two QCL assumptions {QCL assumption 1, QCL assumption 2}. Further, the terminal device determines that a first mapping relationship is that the first symbol groups #1 to #8 sequentially correspond to the QCL assumption 1, the QCL assumption 2, the QCL assumption 1, the QCL assumption 2, the QCL assumption 1, the QCL assumption 2, the QCL assumption 1, and the QCL assumption 2, or correspond to the QCL assumption 2, the QCL assumption 1, the QCL assumption 2, the QCL assumption 1, the QCL assumption 2, the QCL assumption 1, the QCL assumption 2, and the QCL assumption 1.

Sequential and cyclic mapping means: When a quantity P of QCL assumptions is equal to a quantity of first symbol groups, each first symbol group corresponds to one different QCL assumption. When a quantity P of QCL assumptions is less than a quantity of second symbol groups, the first P first symbol groups respectively correspond to the P QCL assumptions, where for example, a first symbol group k corresponds to a QCL assumption k, and $k \in \{1, \ldots, P\}$; and P first symbol groups starting from a $(P+1)^{th}$ first symbol group sequentially correspond to the P QCL assumptions, where for example, a first symbol group P+k corresponds to the QCL assumption k, and a first symbol group 2P+k corresponds to the QCL assumption k.

Mapping mode D: The P QCL assumptions are mapped to the m first symbol groups in a centralized manner.

For example, the terminal device receives the first indication information indicating the m=4 first symbol groups, where first symbol groups #1 to #4 in the m=4 first symbol groups sequentially occupy four time units #1 to #4 in time domain. The terminal device receives second indication information and determines two QCL assumptions {QCL assumption 1, QCL assumption 2}. Further, the terminal device determines that a first mapping relationship is that the first symbol groups #1 to #4 sequentially correspond to the QCL assumption 1, the QCL assumption 1, the QCL assumption 2, and the QCL assumption 2, or correspond to the QCL assumption 2, the QCL assumption 2, the QCL assumption 1, and the QCL assumption 1.

Centralized mapping means: When a quantity P of QCL assumptions is equal to a quantity of first symbol groups, each first symbol group corresponds to one different QCL assumption. When a quantity P of QCL assumptions is less than a quantity of first symbol groups, the first symbol groups are classified into P parts, and each part corresponds to one different QCL assumption. When the quantity K of first symbol groups is an integer multiple of the quantity P of QCL assumptions, each part includes K/P first symbol groups. When the quantity K of first symbol groups is not an integer multiple of the quantity P of QCL assumptions, the first $$\left\lceil \frac{K}{P} \right\rceil - 1$$

parts each include K/P first symbol groups, a $$\left\lceil \frac{K}{P} \right\rceil^{th}$$

part includes $$K - \left(\left\lceil \frac{K}{P} \right\rceil - 1\right) \times P$$

first symbol groups, and all first symbol groups in a $k^{th}$ first symbol group correspond to a QCL assumption k, where $k \in \{1, \ldots, P\}$.

In S940, the terminal device determines n symbol groups B and a QCL assumption corresponding to each of the n symbol groups B based on the indication information #1 and the indication information #2.

In another implementation of S940, the terminal device determines the QCL assumption corresponding to each of the n symbol groups B based on the mapping relationship between the m symbol groups A and the P QCL assumptions.

This solution also includes the case 1 and the case 2 in the embodiment shown in FIG. 2 of this application. The terminal device may also determine the n symbol groups B according to the method for determining the n symbol groups B in the embodiment shown in FIG. 2. Details are not described herein again.

That the terminal device determines the QCL assumption corresponding to each of the n symbol groups B is described in detail below.

A symbol in any one of the n symbol groups B is included in one of the m symbol groups A. In other words, a symbol in one of the n symbol groups B is a whole set or a subset of a symbol in one of the m symbol groups A. The terminal device determines a QCL assumption of a symbol group B by using a symbol group A that includes the symbol group B. That is, the QCL assumption of the symbol group B is the same as a QCL assumption of the symbol group A that includes the symbol group B. In other words, each of the n symbol groups B corresponds to one symbol group A, a symbol in each symbol group B belongs to the corresponding symbol group A, and the QCL assumption corresponding to each symbol group B is a QCL assumption corresponding to the symbol group A corresponding to the symbol group B.

Figure 10:
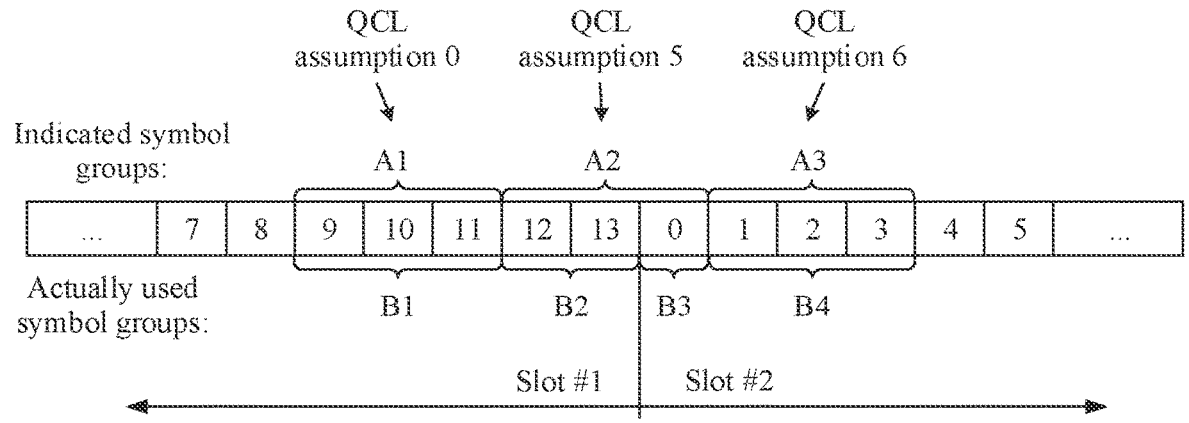
FIG. 10 is a schematic diagram of another example of a QCL assumption corresponding to each of n symbol groups B according to this application.

For example, in FIG. 10, both a symbol group B2 and a symbol group B3 are included in a symbol group A2. In this case, both the symbol group B2 and the symbol group B3 correspond to the symbol group A2, and a QCL assumption corresponding to the symbol group A2, that is, a QCL assumption 5, is used when the symbol group B2 and the symbol group B3 are separately used to send the TB #1. A symbol group B1 and a symbol group B4 are respectively whole sets of a symbol group A1 and a symbol group A3. To be specific, the symbol group B1 corresponds to the symbol group A1, and the symbol group B4 corresponds to the symbol group A3. In this case, a QCL assumption used when the symbol group B1 is used to send the TB #1 is a QCL assumption corresponding to the symbol group A1, that is, a QCL assumption 0, and a QCL assumption used when the symbol group B4 is used to send the TB #1 is a QCL assumption corresponding to the symbol group A3, that is, a QCL assumption 6.

Figure 11:
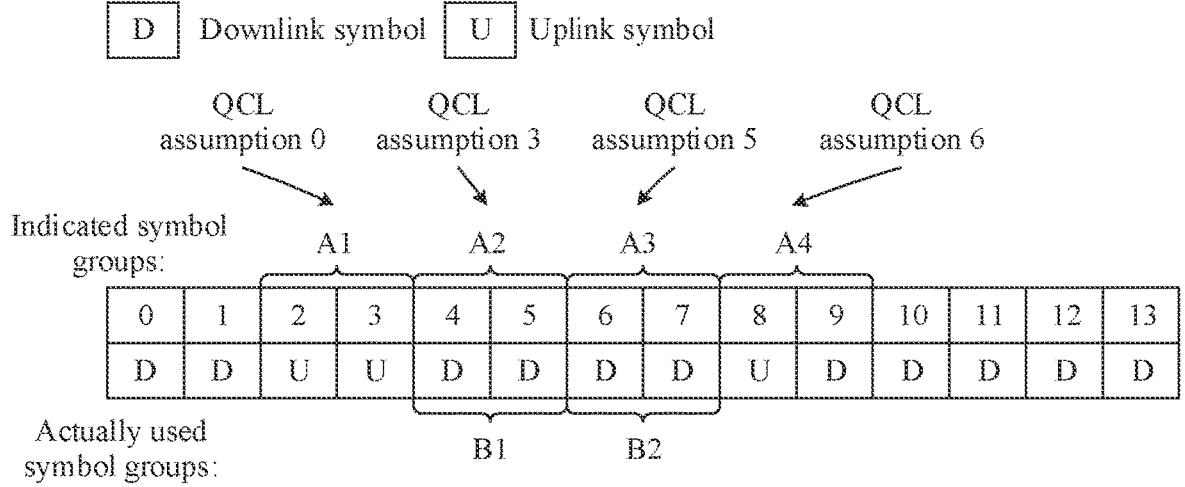
FIG. 11 is a schematic diagram of another example of a QCL assumption corresponding to each of n symbol groups B according to this application.

For another example, in FIG. 11, a symbol group B1 and a symbol group B2 are respectively whole sets of a symbol group A2 and a symbol group A3. To be specific, the symbol group B1 corresponds to the symbol group A2, and the symbol group B2 corresponds to the symbol group A3. In this case, a QCL assumption corresponding to the symbol group A2, that is, a QCL assumption 3, is used when the symbol group B1 is used to send the TB #1, and a QCL assumption corresponding to the symbol group A3, that is, a QCL assumption 5, is used when the symbol group B2 is used to send the TB #1.

S950: The network device separately sends the TB #1 on the n symbol groups B.

S960: The terminal device receives, by using the n symbol groups B and QCL assumptions respectively corresponding to the n symbol groups B, the TB #1 separately sent on the n symbol groups B.

In this solution, when the n symbol groups B include two symbol groups B obtained through division of one symbol group A including symbols in different slots, because a same QCL assumption (that is, a QCL assumption corresponding to the symbol group A including the symbols in the different slots) is used when the two symbol groups B are separately used to send the TB #1, the two symbol groups B may share a same DMRS, thereby reducing DMRS overheads and improving resource utilization.

It is defined that each of the n symbol groups B actually used to send the TB #1 uses a QCL assumption of a symbol group A corresponding to the symbol group B, so that a case in which the network device and the terminal device have inconsistent understandings on QCL assumptions used for different repeated transmissions is avoided. Further, resource utilization is improved by supporting retransmitting and multiplexing a DMRS for a plurality of times.

Figure 12:
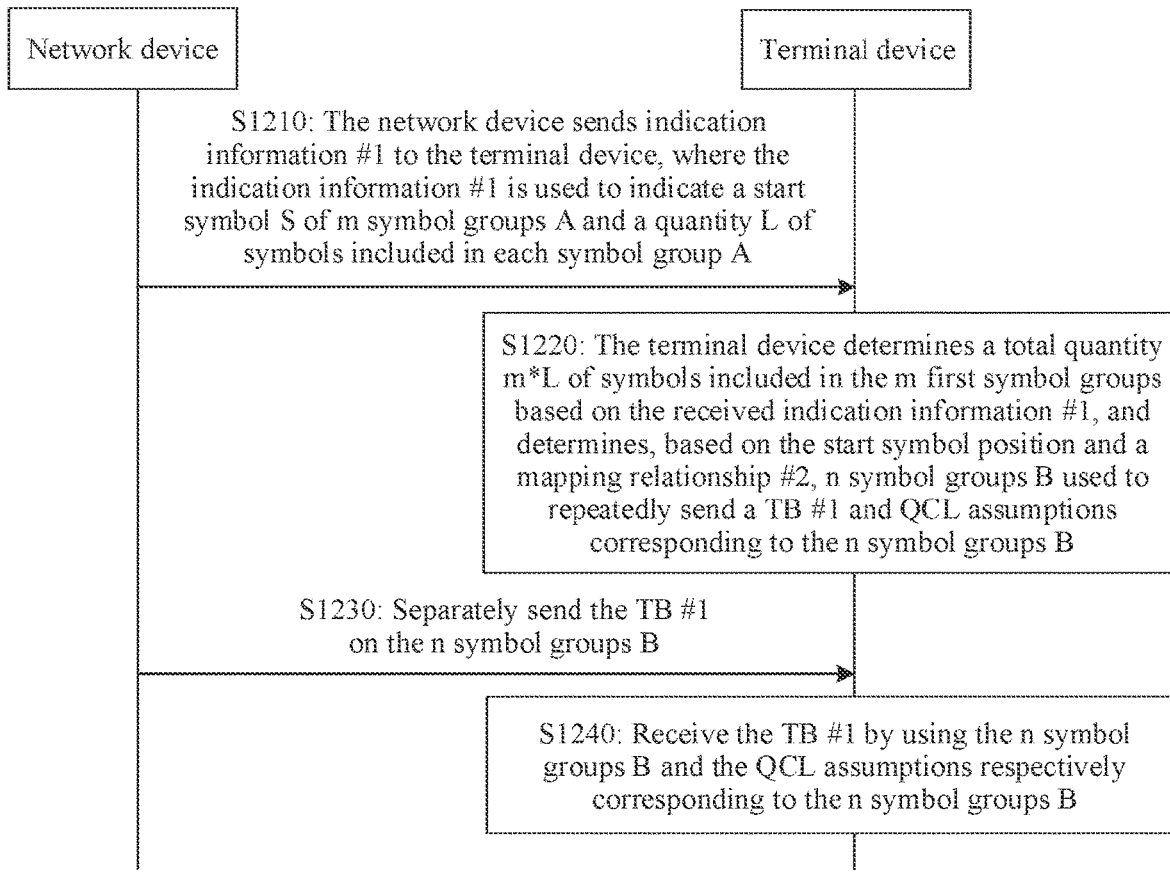
FIG. 12 is a schematic flowchart of another example of a wireless communication method according to this application.

FIG. 12 is another example flowchart of a wireless communication method according to an embodiment of this application.

S1210: A network device sends indication information #1 to a terminal device, where the indication information #1 is used to indicate a start symbol S of m symbol groups A and a quantity L of symbols included in each symbol group A.

S1220: The terminal device determines a total quantity K=m*L of symbols included in the m symbol groups A based on the received indication information #1, and determines, based on the start symbol position S and a mapping relationship #2, n symbol groups B used to send a TB #1 and QCL assumptions corresponding to the n symbol groups B.

For example, the terminal device determines whether the m symbol groups A include symbols in different slots and determines time domain positions of the n symbol groups B based on the quantity m*L of symbols included in the m symbol groups A and the start symbol position indicated by the indication information #1.

If the K symbols include symbols in different slots, the m symbol groups A are divided into the n symbol groups B by a slot boundary, and a position relationship between the n symbol groups B in time domain is determined based on the start symbol S indicated by the indication information #1 and the mapping relationship #2. The mapping relationship #2 may indicate that two consecutive symbol groups B are separated by a preset quantity of symbols, and the preset quantity is an integer greater than or equal to 0. In this case, there are n−1 intervals of a preset quantity of symbols between the n symbol groups B. If symbols in the K symbols all belong to a same slot, the n symbol groups B are the same as the m symbol groups A, and the time domain positions of the n symbol groups B are determined based on the start symbol indicated by the indication information #1 and the mapping relationship #2.

Figure 13:
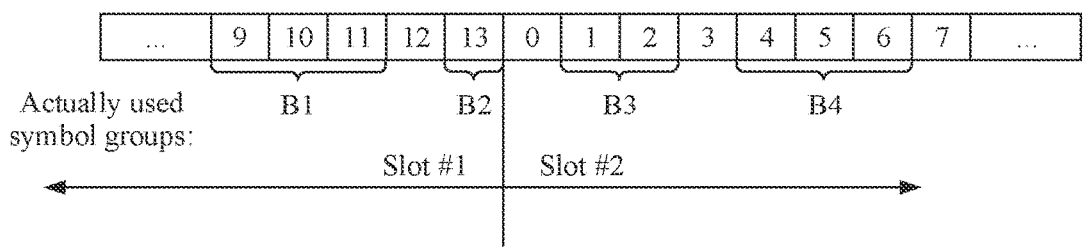
FIG. 13 is a schematic diagram of another example of determining n symbol groups B according to this application.

For example, as shown in FIG. 13, the indication information #1 indicates that the start symbol of the m symbol groups A is a symbol 9, and each symbol group A includes three symbols. In addition, a quantity of repeated transmissions that is indicated by the network device is 3. In this case, three symbol groups A include nine (3×3) symbols in total. The mapping relationship #2 indicates that two consecutive symbol groups B are separated by one symbol. In this case, starting from the start symbol 9, a symbol group B1 includes symbols 9, 10, and 11, and after an interval of one symbol 12, a next symbol group should include a symbol 13 of a slot #1 and symbols 0 and 1 of a slot #2. However, because of a slot boundary, the symbol 13 of the slot #1 independently forms a symbol group B2. Then, after an interval of one symbol, that is, the symbol 0 of the slot #2, a symbol group B3 includes symbols 1 and 2 of the slot #2, and then after an interval of one symbol, a symbol group B4 includes symbols 4, 5, and 6 of the slot #2. In this case, four symbol groups B are separately: the symbol group B1 including the symbols 9, 10, and 11 of the slot #1, the symbol group B2 including the symbol 13 of the slot #1, the symbol group B3 including the symbols 1 and 2 of the slot #2, and the symbol group B4 including the symbols 4, 5, and 6 of the slot #2.

For example, the TB #1 is carried on a signal #1, and the terminal device determines, based on the mapping relationship #2, time domain positions of the n symbol groups B based on the indication information #1 and a position of a symbol that carries a signal #2.

In this implementation, the m symbol groups A are separated by a preset quantity of symbols, and the preset quantity is an integer greater than or equal to 0. Time domain positions of the m symbols may be determined based on the indication information #1 and a quantity m of repetitions. The mapping relationship #2 indicates that when one of the m symbol groups A is discarded and is not used to transmit the TB #1 because the symbol group A includes the symbol occupied by the signal #2, a time domain position of a start symbol of a symbol group A after the discarded symbol group A is moved to the $1^{st}$ available symbol after the symbol occupied by the signal #2. One or more symbol groups A determined based on the mapping relationship #2 are the n symbol groups B used to send the TB #1.

Figure 14:
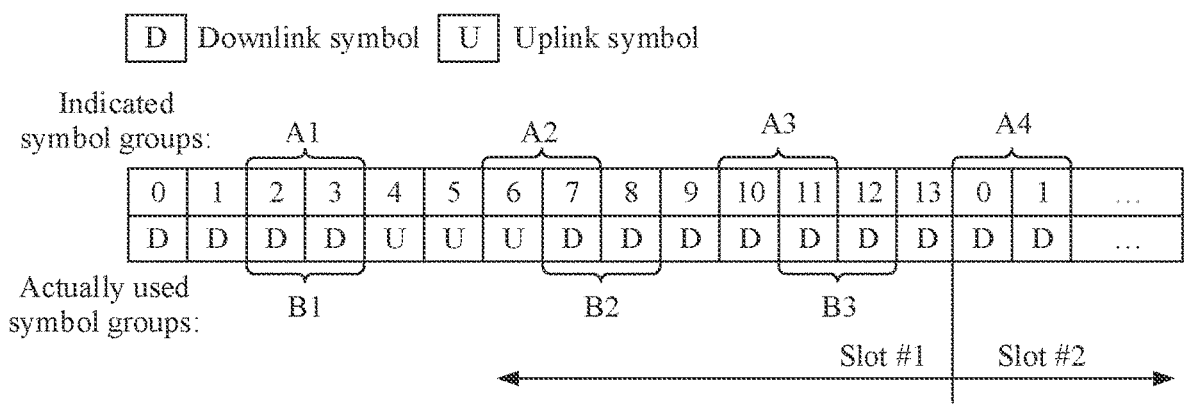
FIG. 14 is a schematic diagram of another example of determining n symbol groups B according to this application.

For example, as shown in FIG. 14, each of four symbol groups A is followed by an interval of two symbols. Because symbols 4, 5, and 6 in a slot #1 are uplink symbols, a symbol group A2 is discarded, and a next symbol group uses a symbol 7 as a start symbol and is separated from a next symbol group by two symbols. That is, after the symbol group A2 is discarded, symbol groups A3 and A4 after the symbol group A2 are moved forward by three symbols, and the $1^{st}$ downlink symbol 7 after the uplink symbol is used as the start symbol. In this case, three symbol groups B actually used to send the TB #1 are separately: a symbol group B1 including symbols 2 and 3, a symbol group B2 including symbols 7 and 8, and a symbol group B3 including symbols 11 and 12.

For a method in which the terminal device determines the QCL assumptions corresponding to the n symbol groups B and a method for determining the quantity m of repetitions, refer to the methods provided in the embodiments shown in FIG. 2 and FIG. 9. Details are not described herein again.

In this solution, a symbol interval between repeated transmissions is determined based on the n symbol groups B actually used for retransmission, thereby shortening time for completing repeated transmission.

It should be noted that although an example in which the n symbol groups B are downlink symbol resources used when the network device sends a downlink TB to the terminal device is used for description in FIG. 2, FIG. 9, and FIG. 12, the embodiments of this application are also applicable to uplink transmission, that is, the n symbol groups B are uplink symbol resources that are allocated by the network device to the terminal device and that are used to send an uplink TB. After receiving the indication information #1 and #2 sent by the network device, the terminal device sends the uplink TB by using the n symbol groups B and the QCL assumptions respectively corresponding to the n symbol groups B.

It should be understood that sequence numbers of the processes do not mean execution sequences in the foregoing embodiments. The execution sequences of the processes should be determined based on functions and internal logic of the processes, and should not be construed as any limitation on the implementation processes of the embodiments of this application.

The foregoing describes in detail the methods provided in the embodiments of this application with reference to FIG. 2 to FIG. 14. The following describes in detail apparatuses provided in the embodiments of this application with reference to FIG. 15 to FIG. 17.

Figure 15:
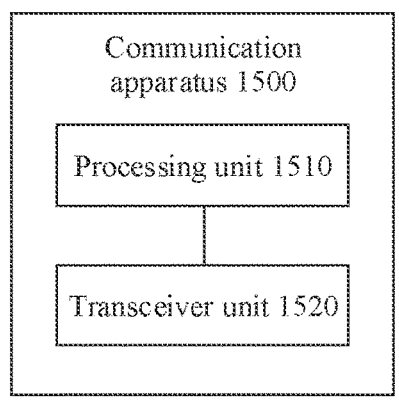
FIG. 15 is a schematic block diagram of an example of a wireless communication apparatus according to this application.

FIG. 15 is a schematic block diagram of a communication apparatus according to an embodiment of this application. As shown in FIG. 15, the communication apparatus 1500 may include a processing unit 1510 and a transceiver unit 1520.

In a possible design, the communication apparatus 1500 may correspond to the terminal device in the foregoing method embodiments, for example, may be the terminal device, or a chip configured in the terminal device.

It should be understood that the communication apparatus 1500 may correspond to the terminal device in the methods 200, 900, and 1200 in the embodiments of this application, and the communication apparatus 1500 may include a unit configured to perform the method performed by the terminal device in the method 200 in FIG. 2, the method 900 in FIG. 9, and the method 1200 in FIG. 12. In addition, the units in the communication apparatus 1500 and the foregoing other operations and/or functions are separately intended to implement corresponding procedures in the method 200 in FIG. 2, the method 900 in FIG. 9, and the method 1200 in FIG. 12.

When the communication apparatus 1500 is configured to perform the method 200 in FIG. 2, the processing unit 1510 may be configured to perform S220 in the method 200, and the transceiver unit 1520 may be configured to perform S210, S230, and S240 in the method 200. When the communication apparatus 1500 is configured to perform the method 700 in FIG. 9, the processing unit 1510 may be configured to perform S920 and S940 in the method 900, and the transceiver unit 1520 may be configured to perform S910, S930, S950, and S960 in the method 900. When the communication apparatus 1500 is configured to perform the method 1200 in FIG. 12, the processing unit 1510 may be configured to perform S1220 in the method 1200, and the transceiver unit 1520 may be configured to perform S1210, S1230, and S1240 in the method 1200. It should be understood that, a specific process in which each unit performs the foregoing corresponding step has been described in detail in the foregoing method embodiments. For brevity, details are not described herein again.

Figure 16:
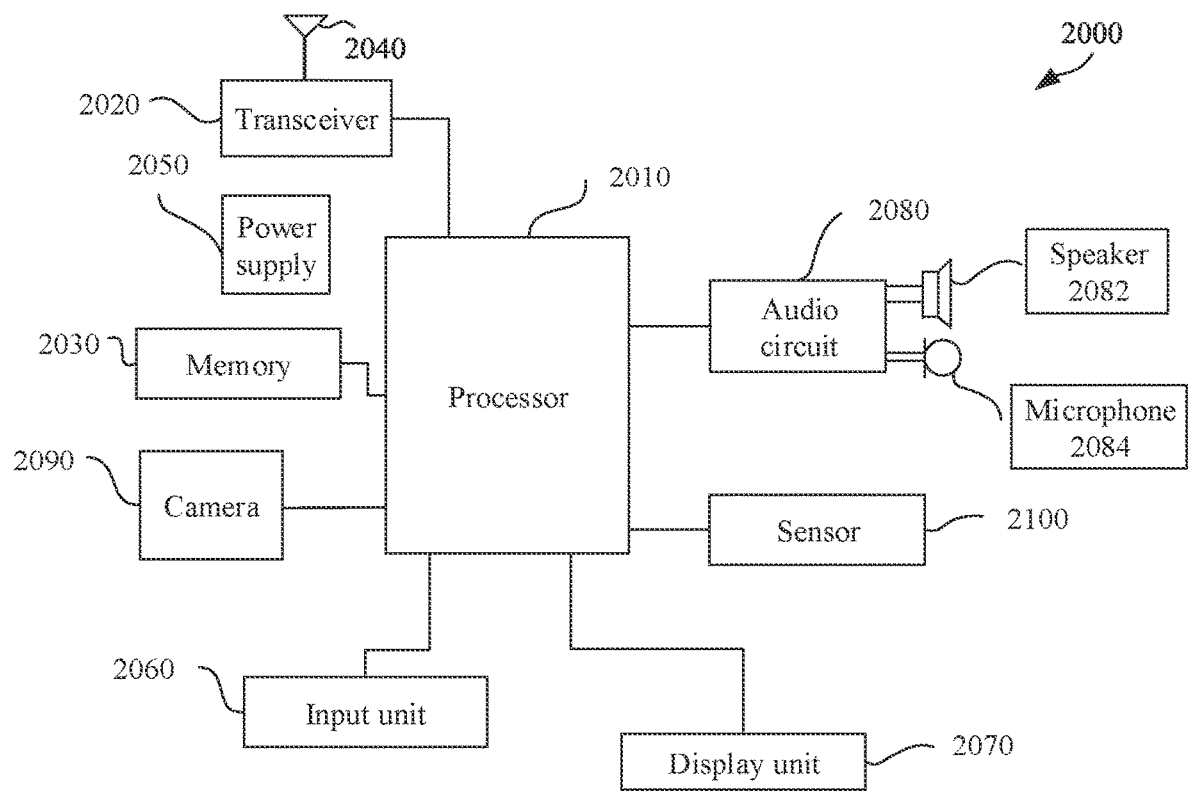
FIG. 16 is a schematic diagram of a structure of an example of a terminal device according to this application.

It should be further understood that, when the communication apparatus 1500 is the terminal device, the transceiver unit 1520 in the communication apparatus 1500 may correspond to a transceiver 2200 in a terminal device 2000 shown in FIG. 16, and the processing unit 1110 in the communication apparatus 1100 may correspond to a processor 2010 in the terminal device 2000 shown in FIG. 16.

It should be further understood that, when the communication apparatus 1500 is the terminal device, the transceiver unit 1520 in the communication apparatus 1500 may be implemented by using a communication interface (for example, a transceiver or an input/output interface), for example, may correspond to the transceiver 2020 in the terminal device 2000 shown in FIG. 16, and the processing unit 1510 in the communication apparatus 1500 may be implemented by using at least one processor, for example, may correspond to the processor 2010 in the terminal device 2000 shown in FIG. 16.

Optionally, the communication apparatus 1500 may further include a storage unit. The storage unit may be configured to store instructions or data. The processing unit may invoke the instructions or the data stored in the storage unit, to implement a corresponding operation.

It should be understood that, a specific process in which each unit performs the foregoing corresponding step has been described in detail in the foregoing method embodiments. For brevity, details are not described herein again.

In another possible design, the communication apparatus 1500 may correspond to the network device in the foregoing method embodiments, for example, may be the network device, or a chip configured in the network device.

It should be understood that the communication apparatus 1500 may correspond to the network device in the methods 200, 900, and 1200 in the embodiments of this application, and the communication apparatus 1500 may include a unit configured to perform the method performed by the network device in the method 200 in FIG. 2, the method 900 in FIG. 9, and the method 1200 in FIG. 12. In addition, the units in the communication apparatus 1500 and the foregoing other operations and/or functions are separately intended to implement corresponding procedures in the method 200 in FIG. 2, the method 900 in FIG. 9, and the method 1200 in FIG. 12.

When the communication apparatus 1500 is configured to perform the method 200 in FIG. 2, the processing unit 1510 may be configured to perform S220 in the method 200, and the transceiver unit 1120 may be configured to perform S210, S230, and S240 in the method 200. When the communication apparatus 1100 is configured to perform the method 700 in FIG. 7, the processing unit 1110 may be configured to perform S920 and S940 in the method 700, and the transceiver unit 1120 may be configured to perform S910, S930, S950, and S760 in the method 700. It should be understood that, a specific process in which each unit performs the foregoing corresponding step has been described in detail in the foregoing method embodiments. For brevity, details are not described herein again.

Figure 17:
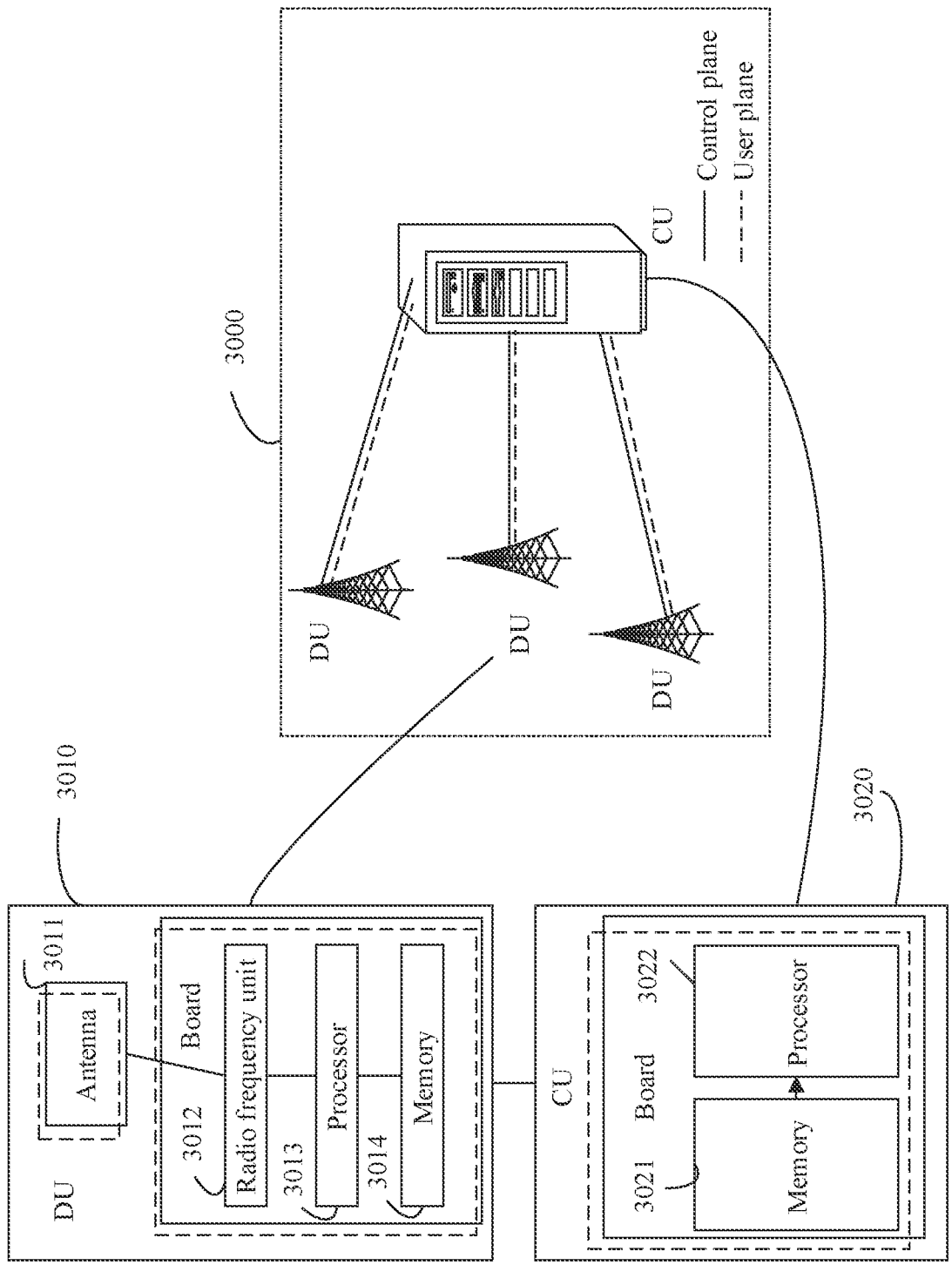
FIG. 17 is a schematic diagram of a structure of an example of a network device according to this application.

It should be further understood that, when the communication apparatus 1500 is the network device, the transceiver unit in the communication apparatus 1500 may correspond to a DU 3010 in a network device 3000 shown in FIG. 17, and the processing unit 1510 in the communication apparatus 1500 may correspond to a processor 1300 in the network device 1300 shown in FIG. 17.

Optionally, the communication apparatus 1500 may further include a storage unit. The storage unit may be configured to store instructions or data. The processing unit may invoke the instructions or the data stored in the storage unit, to implement a corresponding operation.

It should be understood that, a specific process in which each unit performs the foregoing corresponding step has been described in detail in the foregoing method embodiments. For brevity, details are not described herein again.

It should be further understood that, when the communication apparatus 1500 is the network device, the transceiver unit 1520 in the communication apparatus 1500 may be implemented by using a communication interface (for example, a transceiver or an input/output interface), for example, may correspond to the DU 3010 in the network device 3000 shown in FIG. 17, and the processing unit 1510 in the communication apparatus 1500 may be implemented by using at least one processor, for example, may correspond to the CU 3020 in the network device 3000 shown in FIG. 17.

FIG. 16 is a schematic diagram of a structure of a terminal device 2000 according to an embodiment of this application. The terminal device 2000 may be used in the system shown in FIG. 1, to perform a function of the terminal device in the foregoing method embodiments. As shown in the figure, the terminal device 2000 includes a processor 2010 and a transceiver 2020. Optionally, the terminal device 2000 further includes a memory 2030. The processor 2010, the transceiver 2020, and the memory 2030 may communicate with each other by using an internal connection path, to transfer a control signal and/or a data signal. The memory 2030 is configured to store a computer program. The processor 2010 is configured to invoke the computer program from the memory 2030 and run the computer program, to control the transceiver 1220 to send and receive a signal. Optionally, the terminal device 2000 may further include an antenna 2040, configured to send, by using a radio signal, uplink data or uplink control signaling output by the transceiver 2020.

The processor 2010 and the memory 2030 may be integrated into one processing apparatus. The processor 2010 is configured to execute program code stored in the memory 2030 to implement the foregoing functions. During specific implementation, the memory 2030 may alternatively be integrated into the processor 2010, or may be independent of the processor 2010. The processor 2010 may correspond to the processing unit in FIG. 15.

The transceiver 2020 may correspond to the transceiver unit in FIG. 15. The transceiver 2020 may include a receiver (or referred to as a receiver machine or a receiver circuit) and a transmitter (or referred to as a transmitter machine or a transmitter circuit). The receiver is configured to receive a signal, and the transmitter is configured to transmit a signal.

It should be understood that the terminal device 2000 shown in FIG. 15 can implement the processes related to the terminal device in the method embodiments shown in FIG. 2, FIG. 9, and FIG. 12. The operations and/or the functions of the modules in the terminal device 2000 are separately intended to implement corresponding procedures in the foregoing method embodiments. For details, refer to the descriptions in the foregoing method embodiments. To avoid repetition, detailed descriptions are properly omitted herein.

The processor 2010 may be configured to perform an action that is implemented inside the terminal device and that is described in the foregoing method embodiments, and the transceiver 2020 may be configured to perform an action of receiving or sending that is performed by the terminal device from or to the network device and that is described in the foregoing method embodiments. For details, refer to the descriptions in the foregoing method embodiments. Details are not described herein again.

Optionally, the terminal device 2000 may further include a power supply 2050, configured to supply power to various devices or circuits in the terminal device.

In addition, to improve the functions of the terminal device, the terminal device 2000 may further include one or more of an input unit 2060, a display unit 2070, an audio circuit 2080, a camera 2090, a sensor 2100, and the like, and the audio circuit may further include a speaker 2082, a microphone 2084, and the like.

FIG. 17 is a schematic diagram of a structure of a network device according to an embodiment of this application, for example, may be a schematic diagram of a structure of a base station.

The base station 3000 may be used in the system shown in FIG. 1, to perform a function of the network device in the foregoing method embodiments. As shown in the figure, the base station 3000 may include one or more DUs 3010 and one or more CUs 3020. The CU 3020 may communicate with an NG core (next generation core, NC). The DU 3010 may include at least one antenna 3011, at least one radio frequency unit 3012, at least one processor 3013, and at least one memory 3014. The DU 3010 is mainly configured to: receive or send a radio frequency signal, perform conversion between a radio frequency signal and a baseband signal, and perform partial baseband processing. The CU 3020 may include at least one processor 3022 and at least one memory 3021. The CU 3020 and the DU 3010 may communicate with each other through an interface. A control plane (control plane, CP) interface may be Fs-C, for example, F1-C, and a user plane (user plane, UP) interface may be Fs-U, for example, F1-U.

The CU 3020 is mainly configured to: perform baseband processing, control the base station, and the like. The DU 3010 and the CU 3020 may be physically disposed together, or may be physically disposed separately. To be specific, the base station is a distributed base station. The CU 3020 is a control center of the base station, or may be referred to as a processing unit. The CU 3020 is mainly configured to implement a baseband processing function. For example, the CU 3020 may be configured to control the base station to perform an operation procedure related to the access network device in the foregoing method embodiments.

Specifically, baseband processing of the CU and the DU may be divided based on a protocol layer of a wireless network. For example, functions of a PDCP layer and a layer above the PDCP layer are set on the CU, and functions of protocol layers below the PDCP layer, such as an RLC layer and a MAC layer, are set on the DU. For another example, the CU implements functions of an RRC layer and a PDCP layer, and the DU implements functions of an RLC layer, a MAC layer, and a PHY layer.

In addition, optionally, the base station 3000 may include one or more radio frequency units (RUs), one or more DUs, and one or more CUs. The DU may include at least one processor 3013 and at least one memory 3014. The RU may include at least one antenna 3011 and at least one radio frequency unit 3012. The CU may include at least one processor 3022 and at least one memory 3021.

In an instance, the CU 3020 may include one or more boards, and a plurality of boards may jointly support a radio access network (for example, a 5G network) of a single access standard, or may separately support radio access networks (for example, an LTE network, a 5G network, or another network) of different access standards. The memory 3021 and the processor 3022 may serve one or more boards. In other words, a memory and a processor may be independently disposed on each board, or a plurality of boards may share a same memory and a same processor. In addition, a necessary circuit may be further disposed on each board. The DU 3010 may include one or more boards, and a plurality of boards may jointly support a radio access network (for example, a 5G network) of a single access standard, or may separately support radio access networks (for example, an LTE network, a 5G network, or another network) of different access standards. The memory 3014 and the processor 3013 may serve one or more boards. In other words, a memory and a processor may be independently disposed on each board, or a plurality of boards may share a same memory and a same processor. In addition, a necessary circuit may be further disposed on each board.

It should be understood that the base station 3000 shown in FIG. 17 can implement the processes related to the network device in the method embodiments shown in FIG. 2, FIG. 9, and FIG. 12. The operations and/or the functions of the modules in the base station 3000 are separately intended to implement corresponding procedures in the foregoing method embodiments. For details, refer to the descriptions in the foregoing method embodiments. To avoid repetition, detailed descriptions are properly omitted herein.

It should be understood that, the base station 3000 shown in FIG. 17 is merely a possible architecture of the network device, and this shall not constitute any limitation on this application. The method provided in this application is applicable to a network device of another architecture, for example, a network device including a CU, a DU, and an AAU. A specific architecture of the network device is not limited in this application.

An embodiment of this application further provides a processing apparatus, including a processor and an interface. The processor is configured to perform the method in any one of the foregoing method embodiments.

It should be understood that, the processing apparatus may be one or more chips. For example, the processing apparatus may be a field programmable gate array (field programmable gate array, FPGA), a dedicated integrated chip (application-specific integrated circuit, ASIC), a system on chip (system on chip, SoC), a central processing unit (central processing unit, CPU), a network processor (network processor, NP), a digital signal processing circuit (digital signal processor, DSP), a micro controller unit (micro controller unit, MCU), a programmable controller (programmable logic device, PLD), or another integrated chip.

In an implementation process, the steps in the foregoing methods can be implemented by using a hardware integrated logic circuit in the processor, or by using instructions in a form of software. The steps in the methods disclosed with reference to the embodiments of this application may be directly performed and completed by a hardware processor, or may be performed and completed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in a memory, and the processor reads information in the memory and completes the steps in the foregoing methods in combination with hardware of the processor. To avoid repetition, details are not described herein again.

It should be noted that the processor in the embodiments of this application may be an integrated circuit chip, and has a signal processing capability. In an implementation process, the steps in the foregoing method embodiments can be implemented by using a hardware integrated logic circuit in the processor, or by using instructions in a form of software. The processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, the steps, and the logical block diagrams that are disclosed in the embodiments of this application. The general-purpose processor may be a microprocessor, or the processor may be any conventional processor or the like. The steps in the methods disclosed with reference to the embodiments of this application may be directly performed and completed by a hardware decoding processor, or may be performed and completed by using a combination of hardware in the decoding processor and a software module. The software module may be located in a mature storage medium in the art, such as a random access memory, a flash memory, a read-only memory, a programmable read-only memory, an electrically erasable programmable memory, or a register. The storage medium is located in a memory, and the processor reads information in the memory and completes the steps in the foregoing methods in combination with hardware of the processor.

It may be understood that, in the embodiments of this application, the memory may be a volatile memory or a non-volatile memory, or may include both a volatile memory and a non-volatile memory. The non-volatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM) that is used as an external buffer. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that, the memory in the system and method described in this specification includes but is not limited to these memories and any memory of another proper type.

According to the method provided in the embodiments of this application, this application further provides a computer program product. The computer program product includes computer program code. When the computer program code is run on a computer, the computer is enabled to perform the method in any one of the embodiments shown in FIG. 2, FIG. 9, and FIG. 12.

According to the method provided in the embodiments of this application, this application further provides a computer-readable medium. The computer-readable medium stores program code. When the program code is run on a computer, the computer is enabled to perform the method in any one of the embodiments shown in FIG. 2, FIG. 9, and FIG. 12.

According to the method provided in the embodiments of this application, this application further provides a system. The system includes the foregoing one or more terminal devices and the foregoing one or more network devices.

The network device and the terminal device in the foregoing apparatus embodiments completely correspond to the network device and the terminal device in the method embodiments. A corresponding module or unit performs a corresponding step. For example, the communication unit (transceiver) performs a receiving or sending step in the method embodiments, and a step other than the sending step and the receiving step may be performed by the processing unit (processor). For a function of a specific unit, refer to a corresponding method embodiment. There may be one or more processors.

In the foregoing embodiments, all or some of the foregoing embodiments may be implemented by software, hardware, firmware, or any combination thereof. When software is used to implement the embodiments, all or some of the embodiments may be implemented in a form of a computer program product. The computer program product includes one or more computer instructions. When the computer instructions are loaded and executed on a computer, the procedures or functions according to the embodiments of this application are completely or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (digital video disc, DVD)), a semiconductor medium (for example, a solid-state drive (solid state disc, SSD)), or the like.

The network device and the terminal device in the foregoing apparatus embodiments completely correspond to the network device and the terminal device in the method embodiments. A corresponding module or unit performs a corresponding step. For example, the communication unit (transceiver) performs a receiving or sending step in the method embodiments, and a step other than the sending step and the receiving step may be performed by the processing unit (processor). For a function of a specific unit, refer to a corresponding method embodiment. There may be one or more processors.

Terms such as "component", "module", and "system" used in this specification are used to indicate computer-related entities, hardware, firmware, combinations of hardware and software, software, or software being executed. For example, a component may be but is not limited to a process that runs on a processor, a processor, an object, an executable file, an execution thread, a program, and/or a computer. As shown in the figures, both a computing device and an application that runs on the computing device may be components. One or more components may reside within a process and/or an execution thread, and a component may be located on one computer and/or distributed between two or more computers. In addition, these components may be executed on various computer-readable media that store various data structures. The components may communicate by using a local and/or remote process and according to, for example, a signal having one or more data packets (for example, data from two components interacting with another component in a local system, a distributed system, and/or across a network such as the internet interacting with other systems by using the signal).

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, division into the units is merely logical function division, and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located at one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit.

In the foregoing embodiments, all or some of the functions of the functional units may be implemented by software, hardware, firmware, or any combination thereof. When software is used to implement the functions, all or some of the functions may be implemented in a form of a computer program product. The computer program product includes one or more computer instructions (programs).

When the computer program instructions (programs) are loaded and executed on a computer, the procedures or functions according to the embodiments of this application are completely or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid state disk, SSD)), or the like.

When the functions are implemented in a form of a software functional unit and sold or used as an independent product, the functions may be stored in a computer-readable storage medium. Based on such an understanding, the technical solutions of this application essentially, or the part contributing to the current technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The storage medium includes any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A wireless communication method, comprising:
receiving, by a terminal device, first indication information, wherein the first indication information indicates m first symbol groups, and m is an integer greater than or equal to 2, wherein the m first symbol groups are used for repeated transmission of a first transport block (TB), and wherein each first symbol group comprises at least one symbol;
determining, by the terminal device, a quasi co-location (QCL) assumption corresponding to each of n second symbol groups based on a first mapping relationship, wherein the n second symbol groups are symbol groups actually used when the terminal device sends or receives the first TB, and n is an integer greater than or equal to 1;
communicating, by the terminal device, the first TB by using the n second symbol groups and the QCL assumption corresponding to each of the n second symbol groups; and
receiving, by the terminal device, second indication information,
wherein the second indication information indicates P QCL assumptions, and P is an integer greater than 1; and
the first mapping relationship is a correspondence between the n second symbol groups and the P QCL assumptions.

2. The method according to claim 1, wherein the method further comprises:
receiving, by the terminal device, third indication information, wherein the third indication information indicates a discarded first symbol group in the m first symbol groups, and wherein the n second symbol groups do not comprise a symbol in the discarded first symbol group in the m first symbol groups.

3. The method according to claim 1, wherein symbol distribution of the n second symbol groups is different from symbol distribution of the m first symbol groups.

4. The method according to claim 1, wherein each of the n second symbol groups is further used to carry a demodulation reference signal (DMRS), and wherein a QCL assumption of the DMRS is the same as a QCL assumption corresponding to a second symbol group carrying the DMRS.

5. The method according to claim 1, wherein a QCL assumption corresponding to each second symbol group indicates a spatial characteristic parameter of a reference signal corresponding to the second symbol group.

6. A communication apparatus, comprising at least one processor and one or more memories are coupled to the at least one processor and storing programming instructions for execution by the at least one processor to perform operations comprising:
receiving first indication information, wherein the first indication information indicates m first symbol groups, and m is an integer greater than or equal to 2, wherein the m first symbol groups are used for repeated transmission of a first transport block (TB), and wherein each first symbol group comprises at least one symbol;
determining a quasi co-location (QCL) assumption corresponding to each of n second symbol groups based on a first mapping relationship, wherein the n second symbol groups are symbol groups used when the communication apparatus sends or receives the first TB, and n is an integer greater than or equal to 1;
communicating the first TB by using the n second symbol groups and the QCL assumption corresponding to each of the n second symbol groups; and
receiving second indication information,
wherein the second indication information indicates P QCL assumptions, and P is an integer greater than 1; and
the first mapping relationship is a correspondence between the n second symbol groups and the P QCL assumptions.

7. The communication apparatus according to claim 6, wherein the operations further comprises:
receiving third indication information, wherein the third indication information indicates a discarded first symbol group in the m first symbol groups, and wherein the n second symbol groups do not comprise a symbol in the discarded first symbol group in the m first symbol groups.

8. The communication apparatus according to claim 6, wherein symbol distribution of the n second symbol groups is different from symbol distribution of the m first symbol groups.

9. The communication apparatus according to claim 6, wherein each of the n second symbol groups is further used to carry a demodulation reference signal (DMRS), and wherein a QCL assumption of the DMRS is the same as a QCL assumption corresponding to a second symbol group carrying the DMRS.

10. The communication apparatus according to claim 6, wherein a QCL assumption corresponding to each second symbol group indicates a spatial characteristic parameter of a reference signal corresponding to the second symbol group.

11. The communication apparatus according to claim 6, wherein the communication apparatus is a terminal device, a chip or a chip system.

12. A communication apparatus, comprising at least one processor and one or more memories are coupled to the at least one processor and storing programming instructions for execution by the at least one processor to perform operations comprising:
   sending first indication information, wherein the first indication information indicates m first symbol groups, and m is an integer greater than or equal to 2, wherein the m first symbol groups are used for repeated transmission of a first transport block (TB), and wherein each first symbol group comprises at least one symbol;
   determining a quasi co-location (QCL) assumption corresponding to each of n second symbol groups based on a first mapping relationship, wherein the n second symbol groups are symbol groups used when the communication apparatus sends or receives the first TB, and n is an integer greater than or equal to 1;
   communicating the first TB by using the n second symbol groups and the QCL assumption corresponding to each of the n second symbol groups; and
   sending second indication information,
   wherein the second indication information indicates P QCL assumptions, and P is an integer greater than 1; and
   the first mapping relationship is a correspondence between the n second symbol groups and the P QCL assumptions.

13. The communication apparatus according to claim 12, wherein the operations further comprises:
   sending third indication information, wherein the third indication information indicates a discarded first symbol group in the m first symbol groups, and wherein the n second symbol groups do not comprise a symbol in the discarded first symbol group in the m first symbol groups.

14. The communication apparatus according to claim 12, wherein symbol distribution of the n second symbol groups is different from symbol distribution of the m first symbol groups.

15. The communication apparatus according to claim 12, wherein each of the n second symbol groups is further used to carry a demodulation reference signal (DMRS), and wherein a QCL assumption of the DMRS is the same as a QCL assumption corresponding to a second symbol group carrying the DMRS.

16. The communication apparatus according to claim 12, wherein a QCL assumption corresponding to each second symbol group indicates a spatial characteristic parameter of a reference signal corresponding to the second symbol group.

17. The communication apparatus according to claim 12, wherein the communication apparatus is a network device, a chip or a chip system.

* * * * *

UNITED STATES PATENT AND TRADEMARK OFFICE
CERTIFICATE OF CORRECTION

| | |
|---|---|
| PATENT NO. | : 12,069,645 B2 |
| APPLICATION NO. | : 17/672383 |
| DATED | : August 20, 2024 |
| INVENTOR(S) | : Xianda Liu and Kunpeng Liu |

Page 1 of 1

It is certified that error appears in the above-identified patent and that said Letters Patent is hereby corrected as shown below:

In the Claims

In Column 47, In Line 65, In Claim 1, before "used" delete "actually".

In Column 48, In Line 37, In Claim 6, delete "processor" and insert -- processor; --.

In Column 49, In Line 23, In Claim 12, delete "processor" and insert -- processor; --.

Signed and Sealed this
Nineteenth Day of November, 2024

Katherine Kelly Vidal
*Director of the United States Patent and Trademark Office*